United States Patent
Ooishi et al.

(10) Patent No.: US 8,721,035 B2
(45) Date of Patent: May 13, 2014

(54) IMAGE FORMING METHOD

(71) Applicant: Fujifilm Corporation, Tokyo (JP)

(72) Inventors: Yasufumi Ooishi, Kanagawa (JP); Kiyoshi Irita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/771,969

(22) Filed: Feb. 20, 2013

(65) Prior Publication Data

US 2013/0222467 A1    Aug. 29, 2013

(30) Foreign Application Priority Data

Feb. 29, 2012 (JP) ................... 2012-044116

(51) Int. Cl.
*B41J 2/015* (2006.01)
(52) U.S. Cl.
USPC .................. 347/21; 347/15; 347/43
(58) Field of Classification Search
USPC ........... 347/14, 15, 21, 40, 41, 43, 47, 54, 57, 347/74, 80, 95, 96, 100
See application file for complete search history.

(56) References Cited

U.S. PATENT DOCUMENTS

| 8,328,342 B2 | 12/2012 | Irita et al. | |
|---|---|---|---|
| 8,389,600 B2 * | 3/2013 | Suzuki et al. | 523/160 |
| 2011/0211014 A1 | 9/2011 | Irita | |
| 2011/0227991 A1 | 9/2011 | Sasada et al. | |

FOREIGN PATENT DOCUMENTS

| JP | 2006-281775 A | 10/2006 |
|---|---|---|
| JP | 2010-188661 A | 9/2010 |
| JP | 2010-241049 A | 10/2010 |
| JP | 2010-280751 A | 12/2010 |
| JP | 2011-178033 A | 9/2011 |
| JP | 2011-195687 A | 10/2011 |
| WO | 2009/157262 A1 | 12/2009 |

OTHER PUBLICATIONS

An Office Action; "Notice of Reasons for Rejection," issued by the Japanese Patent Office on Feb. 4, 2014, which corresponds to Japanese Patent Application No. 2012-044116 and is related to U.S. Appl. No. 13/771,969; with English language translation.

* cited by examiner

*Primary Examiner* — Thinh Nguyen
(74) *Attorney, Agent, or Firm* — Studebaker & Brackett PC

(57) ABSTRACT

An image forming method including applying a treatment liquid; and applying a first ink containing a pigment, water, and polymer particles of with the content is 1.0 mass % to 3.0 mass %, and applying a second ink having a different hue to the first ink onto the applied first ink at an ink droplet speed of 6 m/sec to 10 m/sec to form a multi-color image, in which an interval from a landing time point of the first ink to a landing time point of the second ink is 200 msec or less, and a dot diameter φ2 of the second ink, and a dot diameter φ1 of the second ink in an ink droplet amount equal to an ink droplet amount in the forming of the multi-color image satisfy a relationship of $0.90 \leq \varphi 2/\varphi 1 \leq 1.10$.

15 Claims, 1 Drawing Sheet

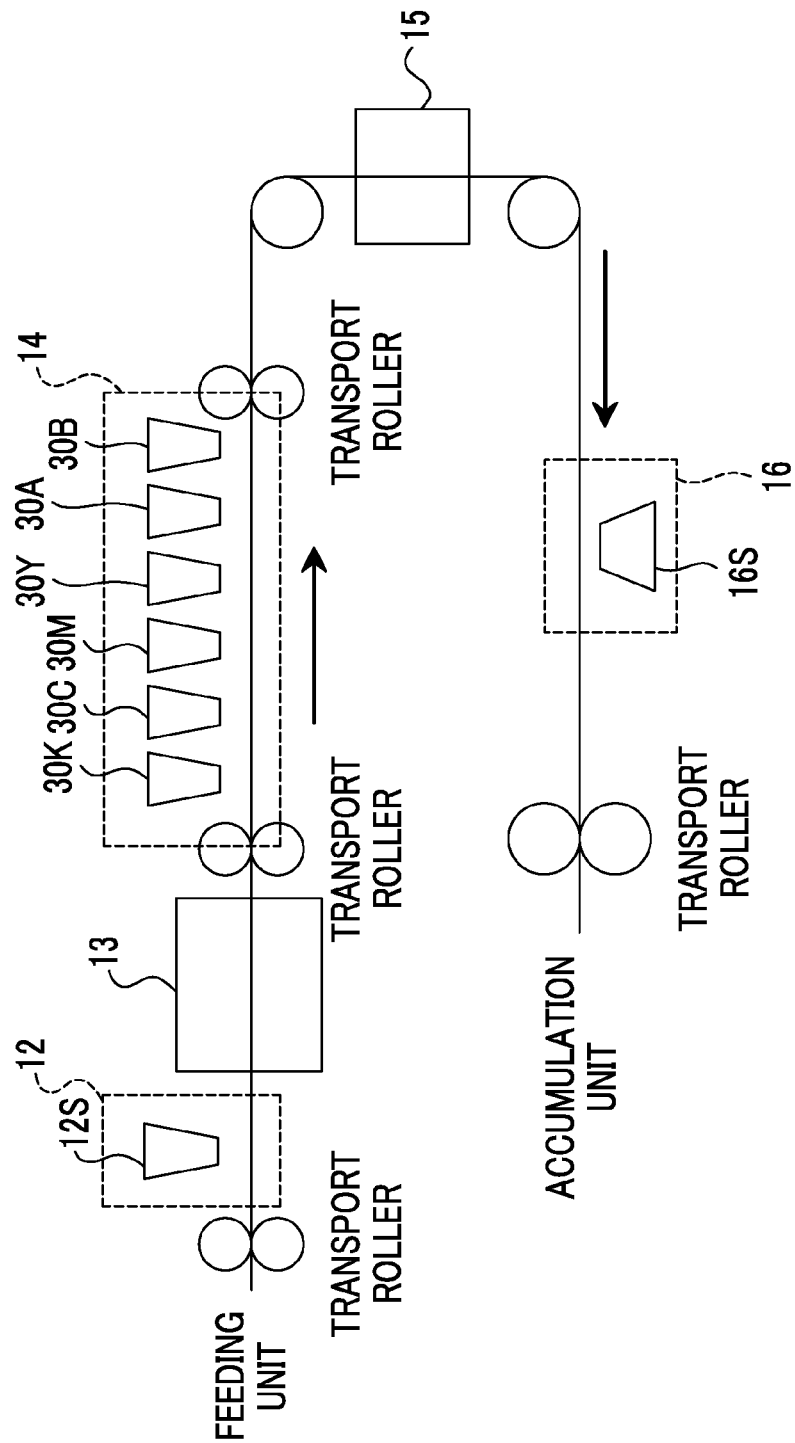

IMAGE FORMING METHOD

BACKGROUND OF THE INVENTION

1. Field of the Invention

The present disclosure relates to an image forming method using an ink jet method.

2. Description of the Related Art

Since the ink jet method is capable of forming a desired image on various target recording media, it is a widely anticipated image forming method in the field of office printers, home printers and the like and in the commercial field.

In image forming according to the ink jet method (also referred to as an ink jet recording), inks of different colors are overlapped and applied onto a recording medium, thereby forming images of multiple colors (secondary colors, tertiary colors and the like).

For example, as an image forming method in which density unevenness is reduced, and with little ink bleeding between the inks of each color, there is known an ink jet recording method which, after using a plurality of full line type ink jet heads ejecting active energy ray-curable inks of respectively different colors onto the recording medium and ejecting a first ink on the recording medium, irradiates active energy rays to semi-cure the first ink landed on the recording medium and ejects and lands second ink of the first semi-cured ink, thereby performing image recording, in which, when a dot radius of the second ink ejected on the semi-cured first ink ejected onto the recording medium is set as R, and a dot radius when the second ink is directly ejected onto the recording medium is set at R0, a condition of $0.6 \leq R/R0 \leq 0.9$ is satisfied (for example, refer to WO2009/157262A).

In addition, as one type of the image forming method according to the ink jet method, there is a method forming an image on a recording medium by using an ink containing a pigment and a treatment liquid containing an aggregation component capable of aggregating components in the ink, and aggregating the components in the ink using the treatment liquid.

For example, as an image forming method, suppressing variation in the dot diameter of ink droplets between ink types due to, for instance, insufficient aggregation when recording a multi-color image, and recording high-quality images at high speed, there is known an ink jet recording method which applies in advance a treatment liquid including an acidic substance aggrega and/or insolubilizing components in the ink composition, then uses two or more types of ink composition including at least a pigment on the acidic face of the recording medium to which the treatment liquid is applied, and applies the two or more types of ink composition to the acidic face of the recording medium with droplet landing intervals of 500 msec or less, whereby an image of at least the first color recorded by this application is recorded using ink composition including the pigment, a self-dispersing polymer of which the acid value is 70 to 120 mgKOH/g, and a water-soluble organic solvent (for example, refer to JP2010-241049A).

SUMMARY OF THE INVENTION

However, in the image forming method forming a multi-color image (for example, a two color image) by overlapping and applying two or more types (two colors or more) of inks onto a treatment liquid application face of a recording medium to which treatment liquid containing an aggregation component capable of aggregating components in the ink composition is applied, when the landing intervals between the types of ink are shortened in order to accelerate the image forming, cases where the color gamut of the formed multi-color image is narrowed have been identified. In the following, the phenomenon in which the color gamut is narrowed is referred to as "color gamut narrowing".

The present disclosure has been made in consideration of the above and has an object of providing an image forming method suppressing narrowing of the color gamut of a multi-color image when the landing intervals between ink types are shortened and capable of forming a multi-color image with a wide color gamut at high speed, and the subject thereof is to achieve such an object.

The present inventors found that, when forming a multi-color image by overlapping and applying inks of two or more colors on a recording medium and aggregating the components in these inks, by adjusting the balance of the amount of polymer particles in the ink applied as the first color to the recording medium and the speed during landing of the inks of the other colors applied onto the ink of the first color so as to adjust the dot diameter of the inks of the other colors in a specific range, it is possible to suppress narrowing of the color gamut which occurs during the forming of a multi-color image at high speed, and completed the invention based on these findings.

The specific means for achieving the subject is as follows.

<1> An image forming method comprising: applying a treatment liquid containing an aggregation component capable of aggregating components in an ink composition to a recording medium to form a treatment liquid application face, applying a first ink composition containing a pigment, water, and polymer particles of which the content is 1.0 mass % to 3.0 mass % with respect to the entire composition to the treatment liquid application face using an ink jet method; and applying a second ink composition including a pigment and water and having a different hue to the first ink composition onto the applied first ink composition at an ink droplet speed of 6 m/sec to 10 m/sec to form a multi-color image using an ink jet method, wherein an interval from a landing time point of the first ink composition to a landing time point of the second ink composition is 200 msec or less, and, a dot diameter $\phi 2$ of the second ink composition applied onto the first ink composition, and a dot diameter $\phi 1$ of the second ink composition applied onto the treatment liquid application face in an ink droplet amount equal to an ink droplet amount in the forming of the multi-color image satisfy a relationship of $0.90 \leq \phi 2/\phi 1 \leq 1.10$.

<2> The image forming method according to <1>, in which the recording medium is coated paper having a pigment layer on at least one face of a support in which cellulose pulp is a main component.

<3> The image forming method according to <1> or <2>, in which the first in composition and the second ink composition further contain a polymerizable compound.

<4> The image forming method according to <1> to <3>, in which the first ink composition and the second ink composition further contain a polyfunctional acrylamide compound as a polymerizable compound.

<5> The image forming method according to <3> or <4>, in which at least one of the first ink composition, the second ink composition, and the treatment liquid further contains a polymerization initiator.

<6> The image forming method according to any one of <1> to <5>, in which the second ink composition further contains polymer particles of which the content is 1.0 mass % so 3.0 mass % with respect to the entire composition.

<7> The image forming method according to any one of <3> to <6>, further including: drying a multi-color image after applying the treatment liquid, applying the first ink composition, and applying the second ink composition, and curing the multi-color image by irradiation of active energy rays with respect to the multi-color image after drying the multi-color image.

<8> The image forming method according to any one of <1> to <7>, in which the first ink composition and the second ink composition are respectively applied at intervals of 20 msec or less.

EFFECTS OF THE INVENTION

According to the present disclosure, it is possible to provide an image forming method suppressing narrowing of the color gamut of a multi-color image when the landing intervals between ink types are shortened and capable of forming a multi-color image with a wide color gamut at high speed.

BRIEF DESCRIPTION OF THE DRAWINGS

FIG. 1 is a schematic configuration view illustrating an example of a configuration of an ink jet recording apparatus which uses an embodiment of an image forming method of a present disclosure.

DESCRIPTION OF THE PREFERRED EMBODIMENTS

Below, an image forming method of a present disclosure will be described in detail.

The image forming method of the present disclosure includes: applying a treatment liquid containing an aggregation component capable of aggregating components in following a first ink composition and a second ink composition containing a pigment, water, and polymer particles of which the content is 1.0 mass % to 3.0 mass % with respect to the entire composition to the treatment liquid application face using an ink jet method; and applying the second ink composition including a pigment and water and having a different hue to the first ink composition onto the applied first ink composition at an ink droplet speed of 6 m/sec to 10 m/sec to form a multi-color image using an ink jet method, wherein an interval (below, also referred to as "landing interval between ink types" or "landing interval between the first ink composition and the second ink composition") form a landing time point of the first ink composition to a landing time point of the second ink composition is 200 msec or less, and, in the image forming method, a dot diameter $\phi 2$ of the second ink composition applied onto the first ink composition, and a dot diameter $\phi 1$ of the second ink composition applied onto the treatment liquid application face in an ink droplet amount equal to an ink droplet amount in the forming of the multi-color image satisfy a relationship of $0.90 \leq \phi 2/\phi 1 \leq 1.10$.

According to the image forming method of the present disclosure, by using the above-described configuration, when ink compositions of two or more colors are overlapped and applied to a recording medium and the components in these ink compositions are aggregated to form a multi-color image, it is possible to suppress narrowing of the color gamut of a multi-color image when the landing intervals between ink types are shortened and to thereby form a multi-color image with a wide color gamut at high speed.

Below, the above-described effect according to the present disclosure may also be referred to as "gamut widening effect". In addition, the "ink composition" may be referred to simply as "ink". In addition, the aggregation of the components in the ink (composition) may be referred to as "aggregation of the ink (composition)" or aggregating the components in the ink (composition) may also be referred to as "aggregating the ink (composition)".

Next, description will be given of the reasons supposed to be the reasons for obtaining the above-described effects according to the image forming method of the present disclosure.

An example of one method of forming a multi-color image is a method of forming a multi-color image by applying a treatment liquid containing an aggregation component capable of aggregating ink onto a recording medium, overlapping and applying inks of two or more colors to the treatment liquid application face of the recording medium and causing these inks to aggregate.

In the research of the applicant, it became apparent that, in the forming of such a multi-color image, from the viewpoint of accelerating the image forming, when the landing intervals (for example, the interval between the landing of an ink of a first color and the landing of an ink of a second color) between ink types are shortened (specifically, when the landing intervals between ink types are set to 200 msec or less), there was a tendency for the color gamut of the formed multi-color image to become narrow.

The reason for this is supposed to be as follows.

That is, in the forming of the above-described multi-color image, there is a tendency for a phenomenon (embedding phenomenon) in which a part of the ink droplets of the second and subsequent colors sinks in the thickness direction of the ink of the first color to occur. Below, this phenomenon is also referred to as "burying of the ink droplets" or "burying of the dots".

Thus, in the forming of the above-described multi-color image, when the landing interval between the ink types becomes narrow, the second and subsequent colors of inks may be landing while the aggregation of the components in the ink of the first color is insufficient (that is, while the hardness of the image according to the ink of the first color is insufficient). In such a case, a part of the ink droplets of the second and subsequent colors sinks more deeply in the ink of the first color and the spreading of the dots according to the ink droplets of the second and subsequent colors is unsatisfactory. As a result of the spreading of the dots being unsatisfactory, it is considered that the color generation according to the ink droplets of the second and subsequent colors is deteriorated and the color gamut of the multi-color image is narrowed.

Meanwhile, as a result of further investigation, it is understood that there is a tendency for the color gamut of the multi-color image to narrow even when the spreading of the dots of the second and subsequent colors is excessive (in a case such as where the image according to the ink of the first color is hard). The reason for this is considered to be that the dot shape is distorted (warped) because of the dots of the ink of the second and subsequent colors are excessively spread.

In relation to the spreading of the inks (dots) of the second and subsequent colors, in the image forming method of the present disclosure, a dot diameter $\phi 2$ of the second ink composition applied onto the first ink composition, and a dot diameter $\phi 1$ when a one color image is formed by applying the second ink composition in an ink droplet amount equal to an ink droplet amount (that is, with the same volume) in the forming of the multi-color image to the treatment liquid application face of the recording medium to which the treatment liquid is applied, are configured to satisfy a relationship of $0.90 \leq \phi 2/\phi 1 \leq 1.10$.

Here, the relationship of $0.90 \leq \phi 2/\phi 1 \leq 1.10$ shows that the spreading of the second ink composition in a case of being applied onto the first ink composition in the forming of the multi-color image is to the same extent as the spreading of the second ink composition in a case of being directly applied onto the treatment liquid application face in the forming of the one color image.

In detail, satisfying $0.90 \leq \phi2/\phi1$ shows that the dots of the second ink composition in the multi-color image are spread to a certain extent.

On the other hand, satisfying $\phi2/\phi1 \leq 1.10$ shows that excessive spreading of the dots of the second ink composition in the multi-color image is suppressed. by suppressing the excessive spreading of the dots, distortion of the shape of the dots is suppressed.

Accordingly, in the present disclosure, by satisfying $0.90 \leq \phi2/\phi1 \leq 1.10$, it is considered that the state of the dot diameter and the dot shape of the second ink composition is preferable, the color generation according to the second ink composition is suitably maintained, and a multi-color image having a wide color gamut is formed.

That is, when $\phi2/\phi1$ is less that 0.90, the spreading of the dots of the second ink composition is unsatisfactory, whereby the color generation is deteriorated and the color gamut of the multi-color image is narrowed.

Meanwhile, when $\phi2/\phi1$ exceeds 1.10, the spreading of the dots of the second ink composition is excessive and the dot shape is distorted (warped), whereby the color gamut of The multi-color image is narrowed.

In the present disclosure, from the viewpoint of widening the color gamut, the dot diameter $\phi1$ and the dot diameter $\phi2$ preferably satisfy $0.90 \leq \phi2/\phi1 \leq 1.10$, more preferably satisfy $0.92 \leq \phi2/\phi1 \leq 1.08$, and particularly preferably satisfy $0.95 \leq \phi/\phi1 \leq 1.05$.

The dot diameter in the present disclosure indicates a value measured using a Dot Analyzer DA-6000 manufactured by Oji Scientific Instruments Co., Ltd.

In addition, the dot diameter in the present disclosure indicates the diameter of the circle with the same area as a dot in a case where the dot shape is distorted (in a case of not being circular).

One of the factors determining the magnitude of the ratio ($\phi2/\phi1$) of the dot diameter $\phi1$ and the dot diameter $\phi2$ is considered to be the balance between the hardness of the first ink composition at the time of the application of the second ink composition and the speed (kinetic energy) of the ink droplets during the landing of the second ink composition.

For example, in a case where the hardness of the first ink composition is constant, the speed of the ink droplets at the time of the landing of the second ink composition is increased and, accordingly, the sinking of a part of the second ink composition in the first ink composition becomes deeper. as a result, the spreading of the second ink composition is insufficient and there is a tendency for $\phi2/\phi1$ to become small.

In addition, the hardness of the first ink composition has a tendency to correlate with the content of the polymer particles in the first ink composition. as the content of the polymer particles in the first ink composition becomes greater, there is a tendency for the first ink composition to harden.

In view of the above, in the present disclosure, the content of the polymer particles in the first ink composition and the ink droplet speed during the landing of the second ink composition are adjusted in the following ranges.

Specifically, the content of the polymer particles in the first ink composition is 1.0 mass % to 3.0 mass % with respect to the entire composition.

When the content is less than 1.0 mass %, there is a tendency for the spreading of the second ink composition applied onto the first ink composition to be insufficient, and there is a tendency for the color gamut of the multi-color image to narrow.

On the other hand, when the content exceeds 3.0 mass %, there is a tendency for the spreading of the second ink composition applied onto the first ink composition to be excessive, and there is a tendency for the dot shape of the second ink composition to be distorted and the color gamut of the multi-color image to narrow.

In addition, when the content is 3.0 mass % or less, there are advantages in terms of the ejection performance of the ink and maintainability (cleaning removability).

The content of the polymer particles in the first ink composition is preferably from 1.0 mass % to 2.5 mass % with respect to the entire composition and more preferably from 1.0 mass % to 2.0 mass % from the viewpoint of the ejection performance of the ink and maintainability. On the other hand, the content of the polymer particles in the first ink composition is preferably from 1.5 mass % to 3.0 mass % with respect to the entire composition and more preferably from 2.0 mass % to 3.0 mass % from the viewpoint of easily adjusting $\phi1/\phi2$ according to 0.90 or more to 1.10 or less.

In addition, the ink droplet speed at the time of the landing of the second ink composition is 6 m/s to 10 m/s.

When the ink droplet speed is less than 6 m/s, there are cases where the ink droplet speed becomes unstable.

On the other hand, when the ink droplet speed exceeds 10 m/s, there is a tendency for $\phi2/\phi1$ to easily become less than 0.90, and there is a tendency for the color gamut of the multi-color image to narrow.

The ink droplet speed is preferably 6 m/s to 8 m/s from the viewpoint of the ease of adjusting $\phi2/\phi1$. On the other hand, the ink droplet speed is preferably 8 m/s to 10 m/s from the viewpoint of the stability of the speed.

In the present disclosure, the ink droplet speed at the time of the landing of the second ink composition indicates a value measured according to the stroboscopic photography according to the method of "Velocity of Drops in Full flight" described in NIP25: International Conference on Digital Printing Technologies and Digital Fabrication 2009, Sep. 20, 2009, p71-74.

In more detail, the ink droplet speed at the time of the landing of the second ink composition is calculated based on the time in which the droplets of the second ink composition move a distance (200 μm) from 200 μm above the landing face (first ink composition surface on the recording medium) to the landing face.

Below, description will be given of the recording medium used in the present disclosure, each step of the present disclosure, an example of a suitable ink jet recording apparatus in an embodiment, and the ink composition and treatment liquid used in the present disclosure.

<Recording Medium>

The recording medium in the present disclosure is not particularly limited and it is possible to use general printing paper used in offset printing or the like.

In particular, as the recording medium, coated paper having a pigment layer on at least one face of a support in which cellulose pulp is a main component is suitable. Since the coated paper is comparatively slow to absorb ink and dry in the image recording according to a general ink jet method using aqueous ink, there is a tendency for the spreading of the ink of the second and subsequent colors at the time of forming the multi-color image to be insufficient and for the color gamut to easily decrease. For this reason, when the coated paper is used as the recording medium, the color gamut widening effect according to the present disclosure is more remarkably exhibited.

Below, description will be given focusing on the coated paper.

(Support)

As the support in which cellulose pulp is a main component, a raw material mixing chemical pulp, mechanical pulp, pulp of old recycled paper, or the like in an arbitrary ratio is made into paper by a Fourdrinier former, a gap type of twin wire former, a hybrid former where the upper half portion of a Fourdrinier portion is configured using a twin wire, or the like and used as a support. As necessary, an internal sizing agent, a yield improvising agent, a paper strengthening agent, or the like are added to the raw material.

Here, the "main component" is a component included as 50 mass % or more with respect to the mass of the support.

For the details of the pulp used in the support, the description of paragraph number 0024 in JP2011-12150A can be referenced. In addition, in the support, it is possible to use a filler, an internal sizing agent, or the like. For the details of the filler, internal sizing agent, and the like, the description of paragraph numbers 0025 to 0027 in JP2011-42150A can be referenced.

(Pigment Layer)

The coated paper has one layer or a plurality of pigment layers on at least one face of the support.

The type of the pigment used in the pigment layer is not particularly limited and it is possible to use and organic pigment or inorganic pigment known in the related art. For specific example of the pigments, it is possible to refer to the description of paragraph number 0029 of JP2011-42150A, and, from the viewpoint of improving the image density by maintaining the transparency of the recording medium, a white inorganic pigment is preferable.

It is possible for the pigment layer to further contain additives such as an aqueous binder, an anti-oxidant, a surfactant, a defoaming agent, a foam preventing agent, a ph adjusting agent, a curing agent, a colorant, a fluorescent whitening agent, a preservative, and a waterproofing agent. For more details of aqueous binders, it is possible to refer to the description of paragraph number 0030 of JP2011-42150A.

It is possible to appropriately select a method for forming the pigment layer on the support according to the object thereof without being particularly limited. For example, it is possible to form the pigment layer by coating and drying a dispersion solution in which the pigment is dispersed in water on the paper.

The amount of the pigment in the pigment layer is preferably 0.1 g/m$^2$ to 20 g/m$^2$ or less, it is advantageous in terms of brittleness. The pigment which is included in the pigment layer is preferably contained to be 10 mass % or more with regard to the total solid content of the pigment layer, more preferably 14 mass % or more, and even more preferably 18 mass % or more.

As the coated paper, generally, it is possible to use coated paper known as coated paper, lightweight coated paper, or fine coated paper.

It is possible to use coated paper which is generally commercially available as the coated paper. For example, it is possible to use typical coated paper for printing, and specifically, examples of A2 gloss paper may include "OK Top Coat+" (manufactured by Oji Paper Co., Ltd), "Aurora Coat" (manufactured by Nippon Paper Industries Co., Ltd), "Pearl Coat" (manufactured by Mitsubishi Paper Mills Limited), S Utoriro Coat (manufactured by Daio Paper Corporation), "Mu Coat Neos" (manufactured by Hokuetsu Paper Mills, Ltd), and "Raicho Coat" (manufactured by Chuetsu Pulp & Paper Co., Ltd), examples of A2 mat paper may include "New Age" (manufactured by Oji Paper Co., Ltd), "OK TOP Coat Mat" (manufactured by Oji Paper Co., Ltd), "U Lite" (manufactured by Nippon Paper Industries Co., Ltd), "New V Mat" (manufactured by Mitsubishi Paper Mills Limited), and "Raicho Mat Coat N" (manufactured by Chuetsu Pulp & Paper Co., Ltd), examples of A1 gloss paper may Include "OK Kanefuji+" (manufactured by Oji Paper Co., Ltd), "Tokumitsu Art" (manufactured by Mitsubishi Paper Mills Limited), and "Raicho Toku Art" (manufactured by Chuetsu Pulp & Paper Co., Ltd), example of A1 dull art paper may include "Saten Kanefuji+" (manufactured by Oji Paper Co., Ltd), "Super Mat Art" (manufactured by Mitsubishi Paper Mills Limited), and "Raicho Dull Art" (manufactured by Chuetsu Pulp & Paper Co., Ltd.), and examples of A0 art paper can include "SA Kanefuji+" (manufactured by Oji Paper Co., Ltd), "Superior Art" (manufactured by Mitsubishi Paper Mills Limited), "Raicho Super Art N" (manufactured by Chuetsu Pulp & Paper Co., Ltd), "Ultra Saten Kanefuji+" (manufactured by Oji Paper Co., Ltd), and "Diamond Premium Dull Art" (manufactured by Mitsubishi Paper Mills Limited).

(Preferable Properties of the Recording Medium)

For the recording medium, the transfer amount of pure water into the recording medium which has been measured by a dynamic scanning absorbtometer is preferably 1 ml/m$^2$ or more to 15 ml/m$^2$ or less at a contact time of 100 ms and 2 ml/m$^2$ or more and 20 ml/m$^2$ or less at a contact time of 400 ms.

In the image forming method of the present disclosure, in a case where a specific recording medium with a comparatively low amount of ink absorption in the range of the transfer amount is used, it is possible to form a multi-color image with a wide color gamut while suppressing the insufficient spreading of the ink of the second and subsequent colors. Further, even in a case where the specific recording medium is used, it is possible to obtain a recorded image with higher resolution, and excellent water resistance and abrasion resistance. In other words, according to the image forming method of the present disclosure, it is possible to obtain a multi-color image with a wide color gamut using an ink jet method without using a recording medium (for example, specialized ink jet paper or the like) which exhibits a transfer amount exceeding the transfer amount range and which is able to absorb a large amount of ink. Further, it is possible to obtain a recorded image with higher resolution, and excellent water Resistance and abrasion resistance.

Here, in relation to the transfer amount, 1 ml/m$^2$ or more at a contact time of 100 ms and 2 ml/m$^2$ or more at a contact time of 400 ms indicated that the recording medium has the pigment layer which is able to absorb ink. In addition, 15 ml/m$^2$ or less at a contact time of 100 ms and 20 ml/m$^2$ or less at a contact time of 400 ms indicates that the ink adsorption amount is comparatively small.

That is, that "the transfer amount of pure water into the recording medium which has been measured by a dynamic scanning absorptometer" is in the range described above signifies that the amount of permeation of the ink is small due to the recording medium having the pigment layer.

Here, the dynamic scanning absorptometer (dynamic scanning absorptometer, DSA, Journal of pulp and paper technical cooperation, Volume 48, May 1994, pages 88 to 92, Shigenori Kuga) is an apparatus that is able to accurately measure the adsorption amount of a liquid in a very short period of time. The dynamic scanning absorptometer is an apparatus which performs measurements automatically using a method including (1) reading the rate of liquid adsorption directly from the movement of the meniscus in a capillary tube, (2) using a sample in the shape of a disk, scanning the liquid adsorption head thereon in the shape of a spiral, (3) automatically changing the scanning speed according to a pattern which is set in advance, and measuring only the required number of points with a single sample. The liquid supply head for a paper sample is connected to a capillary tube via a Teflon (registered trademark) tube and the position of the meniscus within the capillary tube is read automatically with an optical sensor. Specifically, the amount of transfer of pure water or ink is measured using a dynamic scanning absorptometer (Model K350 Series D. Kyowa Seiko Co., Ltd). It is possible to determine the transfer amount at contact times of 100 ms and 400 ms by interpolating from a measured value of the transfers amount at a contact time approximating each contact time. The measurement is carried out at 23° C. and 50% RH.

In the recording medium, the amount of transfer or pure water to the recording medium at a contact time of 100 ms which is measured using the dynamic scanning absorptometer is preferably 1 ml/m$^2$ to 15 ml/m$^2$, more preferably 1 ml/m$^2$ to 10 ml/m$^2$, and even more preferably 1 ml/m$^2$ to 8 ml/m$^2$. When the amount of transfer of pure water at a contact time of 100 ms is 1 ml/m$^2$ or more, beading is further suppressed.

In addition, when the amount of transfer is 15 ml/m$^2$ or less, the color gamut widening effect according to the present disclosure is more remarkably exhibited.

Here, beading is a phenomenon during ink jet recording in which variation in concentration is possible due to the colorant in the ink forming lumps in places due to certain ink droplets hitting the recording medium and remaining on the surface of the recording medium in a liquid state without being completely absorbed into the inner portion of the recording medium before the next ink droplets hit the recording medium and then being mixed with the ink droplets hitting afterwards.

In the recording medium, the amount of transfer of pure water to the recording medium At a contact time of 400 ms which is measured using the dynamic scanning absorptometer is Preferably 2 ml/m$^2$ to 20 ml/m$^2$, more preferably 2 ml/m$^2$ to 15 ml/m$^2$, and even more Preferably 2 ml/m$^2$ to 10 ml/m$^2$. If the transfer amount at a contact time of 400 ms is 2 ml/m$^2$ or more, it is possible to further improve the drying property, for example, it is possible to further suppress the generation of spur marks or the like. In addition, if the transfer amount is 20 ml/m$^2$ or less, it is possible to further suppress bleeding, and it is possible to further improve the glossiness of the image portion after drying.

The pigment layer of the coated paper is configured to have the pigment and a resin binder as the main components. It is possible to perform adjustments in a manner which reduces the transfer amount by making the amount of the resin rich as well as in a manner which increases the transfer amount by making the amount of the pigment rich. In addition, it is possible to increase the transfer amount even by increasing the specific surface area of the pigment particles which configure the pigment, layer, for example, reducing the particle diameter or using various types of pigments having a large specific surface area.

<Treatment Liquid Applying Step>

A treatment liquid applying step is a step of applying a treatment liquid containing aggregation components, which cause components in the ink composition (first ink composition and second ink composition) for forming an image to aggregate, to a recording medium.

In this step, the treatment liquid applied onto the recording medium forms and image by coming into contact with the ink composition. In such a case, the components (for example, pigments) in the ink composition are aggregated and an image is fixed on the recording medium.

The details of the treatment liquid will be described in detail below.

The application of the treatment liquid can be performed by applying a known method such as a coating method, an ink jet method, or an immersion method. The coating method is able to be performed using a known coating method using a direct gravure coater, an offset gravure coater, an extrusion die coater, and air doctor coater, a blade coater, a rod coater, a knife coater, a squeeze coater, a reverse roll coater, a bar coater, or the like. Details of the ink jet method are as described earlier.

While the application amount of the treatment liquid is not particularly limited as long as it is possible to aggregate the ink composition, it is preferable to set the application amount of the aggregated component to 0.1 g/m$^2$ or more. In particular, an amount at which the application amount of the aggregated component is 0.2 to 0.7 g/m$^2$ is preferable. When the application amount of the aggregate component is 0.1 g/m$^2$ or more, it is possible to maintain favorable high speed aggregability according to the various types of ink composition and the use thereof. In addition, it is preferable that the application amount of the aggregated component be 0.7 g/m$^2$ or less so that the surface property of the recording medium on which the aggregated component is applied is not negatively affected (change in glossiness or the like).

In addition, in the present disclosure, an ink application step (an ink application first step and an ink application second step, each steps are described below) is provided after the treatment liquid application step and after applying the treatment liquid on the recording medium, until the ink composition is being applied, it is preferable to further provide a heat drying step of heating and drying the treatment liquid on the recording medium. By heating and drying the treatment in advance before the ink application first step, the ink colorability such as bleeding prevention becomes favorable, and it is possible to record a visible image with favorable color density and hue.

The heating and drying is performed through known means for heating such as a heater, means for ventilating using ventilation such as a dryer, or means combining the two. Examples of the heating method include a method of applying heat with a heater or the like from the opposite face side to the face of the recording medium for applying the treatment liquid, a method of blowing warm air or hot air onto the face of the recording medium for applying the treatment liquid, and a heating method using an infrared heater or the like, and The heating may be performed using a combination of a plurality of these.

<Ink Application Step>

The ink application step in the present invention is a step of applying a first ink composition containing a pigment, water, and polymer particles of which the content is 1.0 mass % to 3.0 mass % with respect to the entire composition to a treatment liquid application face of a recording medium to which the treatment liquid is applied using and ink jet method, and of applying a second ink composition including a pigment and water and having a different hue to the first ink composition onto the applied first ink composition using an ink jet method at a speed at which an ink droplet speed during landing is 6 m/sec to 10 m/sec, such that an interval from a landing time point of the first ink composition to a landing time point of the second ink composition is 200 msec or less, so thereby form a multi-color image.

At this time, a dot diameter φ2 of the second ink composition applied onto the first ink composition, and a dot diameter φ1 when a one color image is formed by applying the second ink composition in an ink droplet amount equal to an ink droplet amount in the forming of the multi-color image to the treatment liquid application face of the recording medium to which the treatment liquid is applied, satisfy a relationship 0.90≤φ2/φ1≤1.10. The relationship of 0.90≤φ2/φ1≤1.10 and the ink droplet speed during landing are as previously described. as previously described.

That means the ink application step in the present disclosure have a ink application first step of applying a first ink composition containing a pigment, water, and polymer particles of which the content is 1.0 mass % to 3.0 mass % with respect to the entire composition to a treatment liquid application face of a recording medium to which the treatment liquid is applies using an ink jet method, and a ink application second step of applying a second ink composition including a pigment and water and having a different hue to the first ink composition onto the applied first ink composition at an ink droplet speed of 6 m/sec to 10 m/sec to form a multi-color image using an ink jet method, such that an interval from a landing time point of the first ink composition to a landing time point of the second ink composition is 200 msec or less.

At this time, a dot diameter φ2 of the second ink composition applied onto the first ink composition, and a dot diameter φ1 of the second ink composition applied onto the treatment liquid application face in an ink droplet amount equal to an ink droplet amount in the forming of the multi-color image satisfy a relationship 0.90≤φ2/φ1≤1.10.

Here, the first ink composition contains a pigment, water, and polymer particles of which the content is 1.0 mass % 3.0 mass % with respect to the entire composition, and includes other components as necessary.

The second ink composition is an ink composition having a different hue to the first ink composition, contains a pigment and water, and contains other components as necessary.

Here, without being limited to only one type, the second ink composition may be ink compositions of two or more types having hues which are different from each other.

In the above step, in a case where the second ink composition is n types of ink composition having hues which are different from each other, an image of (n+1) colors is formed (here, n is an integer of one or more). For example, in a case where the second ink composition is only one type, a two color image is formed, in a case where the second ink composition is two types, a three color image is formed, and in a case where the second ink composition is three types, a four color image is formed.

The details of the first ink composition and the second ink composition will be described later.

In this step, the interval (the interval between the first ink and the second ink) between the landing time point of the first ink composition and the landing time point of the second ink composition is 200 msec or less.

In this manner, it is possible to achieve an increase in the speed of the image forming. In addition, in general, since there is a tendency for the color gamut of the multi-color image to be easily narrowed when the landing interval between the ink types is 200 msec or less, by the landing interval being 200 msec or less, the color gamut widening effect according to the present disclosure is remarkably exhibited.

The landing interval between the first ink and the second ink is preferably 180 msec or less and more preferably 160 msec or less from the viewpoints of increased acceleration of the image forming and obtaining a more remarkable color gamut widening effect.

In the present disclosure, the landing interval between the first ink and the second ink indicates a value measured according to the stroboscopic photography according to the method of "Velocity of Drops in Full flight" described in the NIP25: International Conference on Digital Printing Technologies and Digital Fabrication 2009, Sep. 20, 2009, p71-74.

In addition, in this step, the first ink composition and the second ink composition are respectively preferably applied such that the landing interval (below, also referred to as "adjacent landing interval of the same colors" or "adjacent landing interval") with respect to the main scanning direction of the ink droplets landing adjacently is 20 msec or less. That means the first ink composition and the second ink composition are respectively applied at intervals of 20 msec or less. In this manner, further acceleration of the image forming is achieved and the color gamut widening effect according to the present disclosure is more remarkably exhibited. Here, the "main scanning direction" refers to the transport direction of the recording medium.

The above-described adjacent landing interval of the same colors is more preferably 10 msec or less.

In the present disclosure, the adjacent landing interval of the same colors indicates a value measured according to the stroboscopic photography according to the method of "Velocity of Drops in Full flight" described in the NIP25: International Conference on Digital Printing Technologies and Digital Fabrication 2009, Sep. 20, 2009, p71-74.

The image forming using the ink jet method ejects the ink composition on the recording medium by supplying of energy and forms a color image. Here, the method described in paragraph numbers 0093 to 0105 of JP2003-306623A can be applied as a preferable ink jet method of the present disclosure.

The ink jet method is not particularly limited and may be a known method, for example, any of a charge control method where ink is ejected using static induction, a drop on demand method (pressure pulse method) which uses vibration pressure of a piezo element, an acoustic ink jet method where ink is ejected using an acoustic beam (radiation pressure) converted from an electric signal, a thermal ink jet method using the pressure generated by heating the ink to form bubbles, or the like. As the ink jet method, in particular, using the method described in JP1979-59936A (JP-S54-59936A), an ink jet method of causing a sudden change in the volume of ink that receives the effect of thermal energy and ejecting the ink from nozzles by the effective fore caused by the change in state can be used effectively.

Here, the ink jet method includes a method of injecting many ink dots with low concentrations known as photo ink at small volumes, a method of improving image quality using a plurality of inks with essentially the same hue and different concentrations, and a method of using a colorless and transparent ink.

In addition, in the ink application step, image forming is possibly by, for example, changing the transport speed of the recording medium. The transport speed is not particularly limited if within the range where the image quality does not deteriorate and is preferably 100 to 3000 mm/s, is more preferably 150 to 2700 mm/s, and is even more preferably 250 to 2500 mm/s.

However, the transport speed is set such that the landing interval between the first and the second ink is in the range of 200 msec or less.

In addition, in the ink application step, it is preferable that the maximum application amount of the ink composition to the recording medium be 15 ml/m² or less. By the maximum application amount being 15 ml/m² or less, adhesion of the image is superior. Furthermore, as the maximum application amount, 8 to 15 ml/m² is preferable, 8 to 12 ml/m² is more preferable, and 8 to 11 ml/m² is particularly preferable from the viewpoint of adhesion and concentration of the image. It is possible to control the maximum application amount by adjusting the ejection method from the ejection nozzles.

Here, the "maximum application amount (of the ink composition)" refers to the maximum value of the total of the application amount of the first ink composition and the application amount of the second ink composition.

<Drying Step>

The image forming method of the present disclosure more preferably further has a drying step of drying the multi-color image after the ink application step and the treatment liquid application step.

In a form where the image forming method of the present disclosure has a drying step, since the dot diameter and the dot shape of the second ink in the multi-color image is easier to maintain, the color gamut of the multi-color image is further widened.

In the drying step, at least a portion of the water in the image (ink composition) formed on the recording medium is removed by drying. The drying step is provided before a curing step which will be described later and the curing reaction of the polymerizable compound proceeds more favorably in the curing step due to the content of the water in the ink composition being reduced. In particular, it is possible to secure sensitivity in which image forming is established in a case of image forming at high speed such as a method of image forming due to a single pass method where ink is ejected in the main scanning direction and one line is formed by scanning once.

For example, the effect of the invention is more evident in a case of image forming where the transport speed of the recording medium is 100 to 3000 mm/s, and furthermore, the effect of improving the adhesion and scratch resistance is excellent due to the providing of the drying step in a case where the transport speed is 150 to 2700 mm/s and more preferably 250 to 2500 mm/s.

In the drying step of the present disclosure, it is not necessary for the water to always be completely dried and water may remain in the image in the pigment layer. In the drying step, it is instead preferable that the drying is performed such that the water remains in a range where the UV (ultraviolet rays) curing reaction does not deteriorate.

In the drying step, in the water included in the ink composition (image) to which the maximum amount is applied, it is preferable that at least a part of the water included in the ink composition applied on the recording medium in the ink application step be removed under drying conditions (below, referred to as "drying amount") in which 60 to 80 mass % is removed. When the amount of the removed water is 60 mass % or more, it is possible to suppress cockling and favorably maintain the adhesion of the image. In addition, when the amount of the removed water is 80 mass % or less, the adhesion of the image is favorable.

The drying conditions may be set based on the maximum application amount of the ink composition in the ink application step which is appropriately set as necessary. The generation of cockling is suppressed and an image with excellent adhesion is obtained due to the water in the ink composition including a pigment being removed under these drying conditions.

The drying amount in the drying step is able to be calculated as follows. That is, a water amount $W_0$ included in the image formed using the maximum ink application amount without the drying step being provided and a water amount $W_1$ included in the image formed using the maximum ink application amount with the drying step according to predetermined drying conditions are respectively measured. Next, by determining the difference of $W_0$ and $W_1$ and the ratio $(W_0 \cdot W_1)/W_0 \times 100$ [mass %] with respect to $W_0$, the drying amount (mass %) is calculated as the water amount removed by the drying step.

Here, the water amount included in the image is measured using the Karl Fischer method. As the water amount in the present disclosure, a water amount measured under normal measuring conditions using a Karl Fischer moisture meter MKA-520 (manufactured by Kyoto Electronic Manufacturing Co., Ltd) is applied.

The water amount (drying amount) in the ink composition which is removed in the drying step is preferably 60 to 80 mass %, more preferably 65 to 80 mass %, and even more preferably 70 to 80 mass % with regard to the total water amount of the ink composition which is applied with the maximum application amount as 15 ml/m² from the viewpoint of the curing efficiency after drying being favorably maintained.

In addition, the drying is preferably started within 5 seconds from in time at which the landing of the droplets of the ink composition on the recording medium in the ink application step is completed. Here, "within 5 seconds from the point in time at which the landing of the droplets is completed" signifies that wind is blown with respect to the image according to the ink droplets or heat is applied with respect to the image according to the ink droplets within 5 seconds from the time at which the landing of the ink droplets is completed. For example, by transporting the recording medium inside a drying region within 5 seconds from the time at which the landing of the ink droplets is completed, the drying is started within 5 seconds from the time at which the landing is completed.

In addition, the "time at which the landing is completed" indicates the time at which the landing of the droplets of the second ink composition is completed.

The time until the starting of the drying from the time at which the landing of the ink droplets is completed is preferably within 3 seconds.

The drying is performed using heating mean which heats using a heat generator such as a nichrome wire heater, wind blowing means which uses wind such as a dryer, or means where there are used in combination. Examples of the heating method include a method where heat is supplied using a heater or the like from an opposite face side to the image forming face of the receding medium, a method where a warm wind or a hot wind is blown against the image forming face of the recording medium, a heating method where an infrared heater is used, and the like. The heating may be performed by a plurality of these in combination.

<Curing Step>

In a case where the first ink composition and the second ink composition further contain a polymerizable compound, the image forming method of the present disclosure preferably further includes a curing step of curing the multi-color image by irradiating active energy rays with respect to the multi-color image after the drying step.

In the curing step in the present disclosure, curing is carried out by irradiating active energy rays with respect to the formed multi-color image after the drying step. Due to the irradiation of the active energy rays, the polymerizable compound of the ink composition is polymerized an a curing film which includes the pigment is formed. In this manner, the anti-abrasion characteristic of the formed image and the adhesion of the recording medium are further improved.

In addition, since the dot diameter and the dot shape of the second ink in the multi-color image is easier to maintain as a result of curing the multi-color image in the curing step, the color gamut of the multi-color image is further widened.

The active energy rays used in the present disclosure are not particularly limited as long as the active energy rays are capable of polymerizing the polymerizable compound. Examples thereof may include ultraviolet rays, electron beams, and the like, and, among these, from the viewpoint of versatility, ultraviolet rays are preferable. In addition, examples of the generation source of the active energy rays include an ultraviolet irradiation lamp (halogen lamp, high-pressure mercury lamp, and the like), a laser, an LED, an electron irradiation apparatus, or the like.

As the means irradiating the ultraviolet rays, means which is normally used may be used, an particularly, an ultraviolet irradiation lamp is suitable. As the ultraviolet irradiation lamp, a so-called low-pressure mercury lamp where the vapor pressure of the mercury is 1 to 10 Pa during lighting, a high-pressure mercury lamp, a mercury lamp in which a phosphorous body is coated, a UV-LED light source, and the like are suitable. The light spectrum in the ultraviolet region of the mercury lamps and the UV-LED is 450 nm or less and is particularly in the range of 184 nm to 450 nm, and is appropriate for efficiently causing a reaction in the polymerizable compound in an ink composition which is black or colored. In addition, in terms of the mounting of the power source in a printer, a power source with a small size is appropriate with regard to the point of being able to be used. As a mercury lamp, for example, a metal halide lamp, a high-pressure mercury lamp, an ultra-high pressure mercury lamp, a xenon flash lamp, a deep UV lamp, a lamp where a mercury lamp is excited with no electrodes form the outside using microwaves, a UV laser, and the like may be applied. Since the above-described range is included as the emission wavelength region of these lamps, as long as the size of the power source, the input intensity, the lamp shape, and the like permit, these are basically applicable. The light source is selected in combination with the sensitivity of the polymerization initiator which is used.

The ultraviolet ray strength is preferably 500 to 5000 mW/cm$^2$ in the effective wavelength region for the curing. If the irradiation intensity is weak, the formation of a high-quality, robust image may not be achieved. In addition, if the irradiation intensity is too strong, the target recording medium may be damaged or the color material may be faded.

<Ink Jet Recording Apparatus>

Next, an example of an ink jet recording apparatus which is suitable for realizing the image formed method of the present disclosure will be specifically described with reference to FIG. 1. FIG. 1 is a schematic configuration view showing a configuration example of the entire ink jet recording apparatus.

As shown in FIG. 1, the ink jet recording apparatus is provided with a treatment liquid application unit 12 provided with a treatment liquid ejecting head 12S which ejects treatment liquid; a treatment liquid drying zone 13 provided with heating means (not shown) for drying the applied treatment liquid; an ink ejecting unit 14 which ejects each type of the ink composition, and an ink drying zone 15 drying the ejected ink composition, sequentially in the transport direction of the recording medium (in the direction of the arrow in the diagram). In addition, an ultraviolet ray irradiation unit 16 provided with an ultraviolet ray irradiation lamp 16S is provided at a downstream side of the ink drying zone 15 in the transport direction of the recording medium.

The recording medium which is supplied to the ink jet recording apparatus is sent in order to the treatment liquid application unit 12, the treatment liquid drying zone 13, the ink ejecting unit 14, the ink drying zone 15, and the ultraviolet ray irradiation unit 16 using transport rollers from a feeding unit which feeds the recording medium from a case which is filled with the recording media, and is accumulated in a accumulation unit. Other than the method using the transport rollers, a drum transporting method using a drum shaped member, a belt transporting method, a stage transport method using a stage, or the like may be adopted in the transporting.

Out of the plurality of transport rollers which are arranged, at least one of the rollers is able to be a driving roller transmitting the power of a motor (not shown). The recording medium is transported by a predetermined transport amount in a predetermined direction by rotating the driving roller at a set speed with a motor.

The treatment liquid ejecting head 12S which is linking to a storage tank which stores the treatment liquid is provided in the treatment liquid application unit 12. The treatment liquid ejecting head 12S is set so as to be able to eject treatment liquid from ejection nozzles arranged opposite to the recording face of the recording medium and apply liquid droplets of the processing liquid onto the recording medium. Here, the treatment liquid application unit 12 is not limited to the method of ejecting from a head with a nozzle shape and it is possible to adopt a coating method using a coating roller. This coating method is capable of easily applying treatment liquid to approximately the whole face including the image region where the ink droplets are landed on the recording medium by the ink ejecting unit 14 arranged at the downstream side. In order to make the thickness of the treatment liquid on the recording medium regular, for example, an air knife may be used, or there may be provided a method such as providing a gap corresponding to a set amount of the treatment liquid between the recording media and installing a member having sharp corners.

The treatment liquid drying zone 13 is arranged at the downstream side of the recording medium transport direction of the treatment liquid application unit 12. The processing liquid drying zone 13 can be configured by using well-known heating means such as a heater, air-blowing means using blown air such as a dryer, or a combination of these. Examples of the heating means include a method where a heat generator such as a heater is arranged at an opposite face side (for example, below the transport mechanism performing transportation while being mounted with the recording medium in a case where the recording medium is automatically transported) to a cut-off layer forming face of the recording medium, a method where a warm wind or a hot wind is blown against a cut-off layer forming face of the recording medium, a heating method where an infrared heater is used, and the heating may be performed by a plurality of these in combination.

In addition, since the surface temperature of the recording medium changes due to the type of recording medium (material thickness, and the like), the ambient temperature, and the like, it is preferable that a cut-off layer be formed while the temperature is controlled by providing a measuring unit measuring the surface temperature of the recording medium and a control mechanism where a value of the surface temperature of the recording medium measured by the measuring unit is fed back to a heating control unit. As the measuring unit measuring the surface temperature of the recording medium, a contact or non-contact thermometer is preferable.

In addition, solvent removal using a solvent removal roller or the like may be performed. As another aspect, a method of removing excess solvent from the recording medium with an air knife may be used.

The ink ejecting unit 14 is arranged at the downstream side in the recording medium transport direction of the treatment liquid drying zone 13. Recording heads (ink ejecting heads) 30K, 30C, 30M, and 30Y which are respectively linked to ink storage units which store each color of ink of black (K), cyan (C), magenta (M), and yellow (Y) are arranged in the ink ejecting unit 14. In each ink storage unit (not shown), an ink composition corresponding to each hue is stored and supplied to each ink ejecting head 30K, 30M, 30C, and 30Y as necessary when recording an image. In addition, it is possible to further provide recording heads 30A and 30B for ejecting specialized ink as shown in FIG. 1 in the downstream side of the ink ejecting heads 30K, 30C, 30M, and 30Y in the transport direction so that it is possible to eject specialized ink as necessary.

The ink ejecting heads 30K, 30C, 30M, and 30Y eject ink corresponding to respective images from the ejection nozzles arranged to oppose the recording face of the recording medium. In this manner, each color of ink is applied onto the recording face of the recording medium and a color image is recorded.

Specifically, by using two or more among the above-described heads, inks of two or more colors are overlapped and applied on the treatment liquid application face of the recording medium, and the multi-color image is formed. At this time, for example, by adjusting at least one of the distance between the heads the transport speed of the recording medium, the landing intervals between ink types may be adjusted to 200 msec or less. The ink (for example, in a case where a two color image is formed, the second ink, and in a case where a three color image is formed, the second ink and the third ink) applied onto the ink of a first color is ejected such that the ink droplet speed during the landing onto the ink of the first color is 6 m/sec to 10 m/sec.

In addition, each color of ink is preferably applied such that the above-mentioned adjacent landing intervals are 20 msec or less.

The treatment liquid ejecting head 12S and the ink ejecting heads 30K, 30C, 30M, 30Y, 30A and 30B are full line heads in which a large number of ejection holes (nozzles) are lined up across the maximum recording width (maximum recording width) of the image recorded on the recording medium. The above-described treatment liquid ejecting head and ink ejecting heads are capable of performing image recording on the recording medium at a high speed in comparison with serial type heads in which recording is performed while a shuttle head with a short dimensions is scanned back and forth in the width direction (a direction intersecting the transport direction in the transport face of the recording medium) of the recording medium. In the present disclosure, a method which is capable of recording with a serial type of comparatively high speed recording, for example, any recording with a method capable of ejecting and recording in a main scanning direction with a single pass forming one line with one scan may be adopted, however, according to the image recording method of the present disclosure, a high-quality image (specifically, a multi-color image having a wide color gamut) with good reproducibility may be obtained even with a method using a single pass.

Here, the treatment liquid ejecting head 12S and the ink ejecting heads 30K, 30C, 30M, 30Y, 30A and 30B all have the same structure.

The application amount of the treatment liquid and the application amount of the ink composition are preferably adjusted as necessary. For example, for the adjustment and the like of physical properties such as the viscoelasticity of aggregates in which the treatment liquid and the ink composition are able to be mixed, the application amount of the treatment liquid may be changed according to the recording medium.

The ink drying zone 15 is arranged on the downstream side of the ink ejecting unit 14 in the recording medium transport direction. The ink drying zone 15 can be configured similarly to the treatment liquid drying zone 13.

The ultraviolet ray irradiation unit 16 is arranged further to a downstream side of the ink drying zone 15 in the transport direction of the recording medium, irradiates ultraviolet rays using the ultraviolet ray irradiation lamp 16S provided in the ultraviolet ray irradiation unit 16, and polymerizes and cures the monomer components (polymerizable compound) in the image after the drying of the image. The ultraviolet ray irradiation lamp 16S irradiates the entirety of the recording face using the lamp arranged opposite to the recording face of the recording medium and is set to be able to perform curing of the entire image. Here, the ultraviolet ray irradiation unit 16 is not limited to the ultraviolet ray irradiation lamp 16S and is able to adopt a halogen lamp, high-pressure mercury lamp, a laser, an LED, an electron irradiation apparatus, or the like.

The ultraviolet ray irradiation unit 16 may be arranged either before or after the ink drying zone 15 and may be arranged both before and after the ink drying zone 15.

In addition, it is possible for heating means for carrying out a heating step on the recording medium to be arranged in the transport path from a feeding unit to the accumulation unit in the ink jet recording apparatus. For example, by arranging the heating means at a desired position such as the upstream side of the treatment liquid drying zone 13 or between the ink ejecting unit 14 and the ink drying zone 15 and heating the recording medium to a desired temperature, it is possible to effectively perform drying and fixing.

<Ink Composition>

Below, the ink compositions (first ink composition and second ink composition) used in the ink composition step in the present disclosure will be described.

The first ink composition contains pigments, water, and polymer particles of which the content is 1.0 mass % to 3.0 mass % with respect to the entire composition, and includes other components is necessary.

The second ink composition is an ink composition of is a different hue to the first ink composition, contains a pigment and water, and contains other components as necessary.

In the following description, the contents that are common to the first ink composition and the second ink composition will be described by simply referring to the "ink composition".

(Pigment)

The ink composition in the present disclosure includes at least one type of pigment.

The pigment is not particularly limited and can be appropriately selected depending on the purpose, for example, the pigment may be any of an organic pigment or an inorganic pigment.

Examples of the organic pigments include azo pigments, polycyclic pigments, chelate dyes, nitro pigments, nitroso pigments, and aniline black. Among these, azo pigments, polycyclic pigments, and the like are more preferable.

In addition, example of the inorganic pigments include titanium oxide, iron oxide, calcium carbonate, barium sulfate, aluminum hydroxide, barium yellow, cadmium red, chrome yellow, and carbon black. Among these, carbon black is particularly preferable.

In a case where an organic pigment is used, in regard to the average particle diameter of the organic pigment, smaller is good from the viewpoint of transparency and color reproduction and larger is preferable from the viewpoint of resistance to light. From the viewpoint of achieving both of these, an average particle diameter of 10 nm to 200 nm is preferable, 10 to 150 nm is more preferable, and 10 to 20 nm is even more preferable. In addition, the particle distribution of the organic pigment is not particularly limited and any of a pigment with a wide particle diameter distribution or a pigment with a monodispersed particle diameter distribution is sufficient. In addition, two or more types of organic pigments having a monodispersed particle diameter distribution may be mixed and used.

As the pigment, it is possible to use a known pigment disclosed in paragraphs 0142 to 0145 of JP2007-100071A.

As the pigments, more specifically, in a cyan hue ink composition (also referred to as cyan ink), for example, the following cyan pigments can be used, in a yellow hue ink composition (also referred to as yellow ink), for example, the following yellow pigments can be used, and in a magenta hue ink composition (also referred to as magenta ink), for example, the following magenta pigments can be used.

Examples of the cyan pigments include, for example, C. I. pigment blue 15, C. I. pigment blue 15:2, C. I. pigment blue 15:3, C. I. pigment blue 15:4, C. I. pigment blue 16, C. I. pigment blue 60, C. I. pigment green 7, siloxane cross-linked aluminum phthalocyanine as described in U.S. Pat. No. 4,311,775A and the like. Among these, at least one type selected from C. I. Pigment Blue 15:3, C. I. Pigment Blue 15:4, and C. I. Pigment Blue 16 is preferable, and at least one of C. I. Pigment Blue 15:3 and C. I. Pigment Blue 15:4 is particularly preferable.

Examples of the yellow pigments include, for example, C. I. pigment orange 31, C. I. pigment orange 43, C. I. pigment yellow 12, C. I. pigment yellow 13, C. I. pigment yellow 14, C. I. pigment yellow 15, C. I. pigment yellow 17, C. I. pigment yellow 74, C. I. pigment yellow 93, C. I. pigment yellow 94, C. I. pigment yellow 128, C. I. pigment yellow 138, C. I. pigment yellow 151, C. I. pigment yellow 155, C. I. pigment yellow 180, and C. I. pigment yellow 185. Among these, at least one type selected from C. I. Pigment Yellow 74, C. I. Pigment Yellow 155, and C. I. Pigment Yellow 185 is preferable and C. I. Pigment Yellow 74 is the most preferable.

Examples of the mangenta pigments include, for example, C. I. pigment red 2, C. I. pigment red 3, C. I. pigment red 5, C. I. pigment red 6, C. I. pigment red 7, C. I. pigment red 15, C. I. pigment red 16, C. I. pigment red 48, C. I. pigment red 53:1, C. I. pigment red 57:1, C. I. pigment red 122, C. I. pigment red 123, C. I. pigment red 139, C. I. pigment red 144, C. I. pigment red 149, C. I. pigment red 166, C. I. pigment red 177, C. I. pigment red 178, C. I. pigment red 222, and C. I. pigment violet 19. Among these, from the viewpoints of adhesion and scratch resistance, at least one type selected from C. I. Pigment Red 122, C. I. Pigment Red 202, C. I. Pigment Red 209, and C. I. Pigment Violet 19 is preferable.

The above-described pigments may be used as a single type and a plurality of types may also be selected from within each group described above or from between each group and used in combination therewith.

As the content (total content in the case of two or more types) of the pigments in the ink composition, 1 to 25 mass % is preferable and 2 to 15 mass % is more preferable with respect to the entire ink composition from the viewpoint of image density.

(Dispersing Agent)

The ink composition of the present disclosure can contain at least one kind of dispersing agent.

As the dispersing agent of the pigment described above, any of a polymer dispersing agent or a surfactant-type dispersing agent with a low molecular weight is sufficient.

In addition, the polymeric dispersing agent may be either a water-soluble dispersing agent or a water-insoluble dispersing agent.

As the low molecular-weight surfactant-type dispersing agent, for example, it is possible to use the known low molecular-weight surfactant-type dispersing agents disclosed in paragraphs 0047 to 0052 of JP2011-178029A.

As a water-soluble dispersing agent in the polymeric dispersing agents, a hydrophilic polymer compound may be exemplified. Examples of the natural hydrophilic polymer compounds include plant polymers such as gum arabic, gum tragacanth, guar gum, karaya gum, locust bean gum, arabinogalactan, pectin, and Quince seed starch; seaweed based polymers such as alginate, carrageenan, and agar; animal-based polymers such as gelatin, casein, albumin, and collagen; microbial polymers such as xanthene gum and dextran, and the like.

In addition, examples of hydrophilic polymer compounds modifying natural products into raw materials include cellulose-based polymers such as methyl cellulose, ethyl cellulose, hydroxyethyl cellulose, hydroxypropyl cellulose, and carboxymethyl cellulose; starch-based polymers such as sodium starch glycolate and sodium starch phosphate ester; seaweed based polymers such as sodium alginate and propylene glycol alginate, animal-based polymers such as shellac, and the like.

In addition, examples of synthetic hydrophilic polymer compounds include vinyl polymers such as polyvinyl alcohol, polyvinyl pyrrolidone, and polyvinyl methyl ether; non-cross-linked polyacrylamide, polyacrylic acid or an alkali metal salt thereof; acrylic-based resins such as water-soluble styrene acrylic resin; water-soluble styrene-maleic acid resin; water-soluble vinyl napthalene acrylic resin; water-soluble vinyl napthalene maleic acid resin; polyvinylpyrrolidone, polyvinyl alcohol, and alkali metal salts of β-naphthalene sulfonic acid formalin condensate; polymer compounds having a salt of a cationic functional group such as quaternary ammonium or an amino group in a side chain, and the like.

Among these, a water-soluble dispersing agent in which a carboxyl group is introduced is preferable as the water-soluble polymer compound, such as a copolymer of acrylic acid, methacrylic acid, and hydrophilic monomers including another carboxyl group.

As the water-insoluble dispersing agents in the polymeric dispersing agents, it is possible to use a polymer having both a hydrophobic part and a hydrophilic part. For example, styrene-(meth)acrylic acid copolymers, styrene-(meth)acrylic acid (meth)acrylic acid ester copolymers, (meth)acrylic acid ester-(meth)acrylic acid copolymers, poly ethylene glycol (meth)acrylate (meth)acrylic acid copolymers, acetic acid vinyl maleic acid copolymers, styrene-maleic acid copolymers, and the like, may be exemplified.

The weight average molecular weight of the polymeric dispersing agent is preferably 3,000 to 100,000, more preferably 5,000 to 50,000, even more preferably 5,000 to 40,000, and particularly preferable 10,000 to 40,000.

Here, the weight average molecular weight (weight average molecular weight of the polymer configuring the weight average molecular weight of the polymeric dispersing agent and the polymeric particles to be described later) in the present disclosure is measured by gel permeation chromatography (GPC). The GPC used HLC-8220 GPC (manufactured by Tosoh Co., Ltd.), used three columns of TSKgeL Super-HZM-H, TSKgeL SuperHZ4000, TSKgeL SuperHz2000 (manufactured by Tosoh Co., Ltd. 4.6 mmIDx15 cm) as columns, and used THF (tetrahydrofuran) as an eluent. In addition, the conditions were set to a sample density of 0.35% by mass, a flow rate of 0.35 ml/min, a sample introduction amount of 10 μl, and a measurement temperature of 40° C., and the GPC was performed using an IR detector. In addition, the calibration curve was created from eight samples of "Standard Sample TSK standard, polystyrene": "F-40", "F-20", "F-4", "F-1", "A-5000", "A-2500", "A-1000", and "n-propyl benzene".

From the viewpoints of self-dispersibility and aggregation speed when contacting the treatment liquid, the polymeric dispensing agent is preferably a polymer having a carboxyl group, is more preferably a polymer having a carboxyl group and an acid value of 100 mg KOH/g or less, and even is more preferably a polymer having a carboxyl group and an acid value of 25 mg KOH/g to 100 mg KOH/g. In particular, in a case where the ink composition of the present disclosure is used with the treatment liquid, which aggregates components in the ink composition, a polymer dispersing agent which has a carboxyl group and an acid value of 25 mgKOH/g to 100 mgKOH/g is effective. The treatment liquid will be described later.

As the mixing mass ratio (p:s) of the pigment (p) and the dispersing agent (s), a range of 1:0.06 to 1:3 is preferable, a range of 1:0.125 to 1:2 is more preferable, and even more preferable is 1:0.125 to 1:15.

In the present disclosure, a dye may be used instead of the pigment. In a case where a dye is used, it is possible to use a dye which is held in a water-insoluble carrier. As the dye, it is possible to use a known dye without any limitations, and for example, the dyes disclosed in JP2001-115066A, JP2011-335714A, JP2002-249677A, and the like may be suitable used. There is no particular limitation if the carrier insoluble or difficult to dissolve in water and it is possible to use a carrier selected from an inorganic material, an organic material or a composite material thereof. Specifically, the carriers disclosed in JP2001-181549A, JP2007-169418A, and the like may be suitably used.

The carrier (water-insoluble colored particles) holding the dye can be used as an aqueous dispersion using a dispersing agent. As the dispensing agent, the above-described dispersing agents can be suitably used.

In the present disclosure, from the viewpoint of resistance to light, product quality, and the like of the image, the inclusion of the pigment and the dispersing agent is preferable, and the inclusion of the organic pigment and the polymer dispersing agent along with at least a portion of the surface of the pigment being contained as the water dispersible pigment coated by the polymer dispersing agent is more preferable. Furthermore, the ink composition particularly preferably includes the organic pigment and a polymer dispersing agent including a carboxyl group, and includes the water dispersible pigment where at least a portion of the surface of the pigment is coated by the polymer dispersing agent having a carboxyl group, and from the viewpoint of aggregability, the pigment is preferably water-insoluble due to being covered by the polymer dispersing agent including a carboxyl group.

As the average particle diameter of the pigment in a dispersed state, 10 to 200 nm is preferable, 10 to 150 nm is more preferable, and 10 to 100 nm is even more preferable. When the average particle diameter is 200 nm or less, color reproduction is favorable and droplet landing characteristics when droplets are landed using an ink jet method are favorable. When the average particle diameter is 10 nm or more, the resistance to light is favorable. In addition, the particle diameter distribution of the coloring material is not particularly limited, and may be either of a wide particle diameter distribution or a particle diameter distribution with a monodispersed property. In addition, two or more types of coloring material having a particle diameter distribution with a monodispersed property may be mixed and used.

Here, the average particle diameter of the pigment in the dispersed state shows the average particle diameter in the state made into an ink; however, the same applies for the so-called concentrated ink dispersion of the stage before being made into an ink.

Here, the average particle diameter and particle diameter distribution of the pigment and the polymer particles in the dispersed state are determined by measure the volume average particle diameter according to a dynamic light scattering method using the Nanotrac particle diameter distribution measurement apparatus UP-EX150 (manufactured by Nikkiso, Co., Ltd.)

(Water)

The ink composition of the present disclosure contains water and the amount of the water is not particularly limited. In particular, a preferable content of water with respect to the ink composition is 10 to 99 mass %, more preferably 30 to 90 mass %, even more preferably 30 to 80 mass %, and yet more preferably 50 to 70 mass %.

(Polymer Particles)

The first ink composition contains at least one type of polymer particle.

The total content of the polymer particles in the first ink composition is 1.0 mass % to 3.0 mass % with respect to the entire first ink composition. A preferable range for the content is as described above.

The second ink composition may include polymer particles, but need not include polymer particles.

From the viewpoint of the aggregability of the second ink composition, the second ink composition preferably includes polymer particles, and the content thereof is preferably 10 mass % to 15.0 mass % and more preferably 5.0 mass % to 10.0 mass % with respect to the entire second ink composition. However, from the viewpoint of the ejection performance of the second ink composition, fewer polymer particles is preferable, and, from this viewpoint, the same content ranges as the first ink composition are also preferable.

These polymer particles have a function of fixing the ink composition by destabilizing the dispersion and aggregating to increase the viscosity of the ink composition when placed into contact with a treatment liquid described below or a region where this has dried.

It is possible to use the polymer particles as, for example, a latex where a polymer in particle form is dispersed into an aqueous medium. As the polymer, it is possible to use an acrylic resin, a vinyl acetate resin, a styrene-butadiene resin, a vinyl chloride resin, an acrylic-butadiene resin, a butadiene resin, a styrene resin, a cross-linked acrylic resin, a cross-linked styrene-based resin, a benzoguanamine resin, a phenol resin, a silicone resin, an epoxy resin, a urethane resin, a paraffin-based resin, a fluorine resin, or the like. Among these, preferable examples include an acrylic resin, an acrylic-styrene resin, a styrene resin, a cross-linked acrylic resin, and a cross-linked styrene-based resin.

In the polymer particles, self-dispersing polymer particles are preferable.

The self-dispersing polymer particles are a water-insoluble polymer which is able to be in a dispersed state in an aqueous medium due to a functional group (particularly, an acid group or a salt thereof) of the polymer itself when in a dispersed state (particularly a dispersed state using a phase transfer emulsification method) when there is no surfactant, and signify a water-insoluble polymer which does not contain a free emulsifier.

Here, the dispersed state includes both the states of an emulsion state (emulsion) where the water-insoluble polymer is dispersed in a liquid state in the aqueous medium and a dispersion state (suspension) where the water-insoluble polymer is dispersed in a solid state in the aqueous medium.

As the self-dispersing polymer particles, it is possible to use the self-dispersing polymer particles disclosed in paragraphs 0090 to 0121 of JP2010-64480A and paragraphs 0130 to 0167 of JP2011-068085A.

As the molecular weight of the polymer configuring the polymer particles (for example, the self-dispersing polymer particles), a weight average molecular weight of 3,000 to 200,000 is preferable, 5,000 to 150,000 is more preferable, and 10,000 to 100,000 is even more preferable. By setting the weight average molecular weight to 3,000 or more, it is possible to effectively suppress the amount of water-soluble components. In addition, by setting the weight average molecular weight to 200,000 or less, it is possible to increase the self-dispersion stability.

From the viewpoint of hydrophilic control and hydrophobic control of the polymer, the water-insoluble polymer configuring the particles of the self-dispersing polymer particles preferably includes 15 to 80% by mass of the total mass of the self-dispersing polymer particles as the copolymerizing ratio of structure units derived from aromatic group-containing (meth)acrylate monomers (preferably, structure units derived from phenoxyethyl (meth)acrylate and/or structure units derived from benzyl (meth)acrylate).

In addition, from the viewpoint of hydrophilic control and hyrdophobic control of the polymer, the water-insoluble polymer preferably includes 15 to 80% by mass of structural units derived from an aromatic group-containing (meth)acrylate monomer as the copolymerization ratio, structural units derived from a carboxyl group-containing monomer, and structural units derived from an alkyl group-containing monomer (preferably, structural units derived from an alkyl ester of (meth)acrylate): more preferably includes 15 to 80% by mass of structural units derived from phenoxyethyl (meth)acrylate and/or structural units derived from benzyl (meth)acrylate monomer as the copolymerization ratio, structural units derived from a carboxyl group-containing monomer, and structural units derived from an alkyl group-containing monomer (preferably, structural units derived from an alkyl ester of 1 to 4 carbon atoms of (meth)acrylate); and additionally, it is preferable that the acid value be 25 mgKOH/g to 100 mgKOH/g and the weight average molecular weight be 3000 to 200,000, and more preferable that the acid value be 25 mgKOH/g to 95 mgKOH/g and the weight average molecular weight be 5000 to 150,000.

(Polymerizable Compound)

The ink composition in the present disclosure preferably includes at least one type of polymerizable compound.

The polymerizable compound is polymerized by being irradiated by active energy rays in the previously mentioned curing step. In this manner, the multi-color image is cured. By curing the multi-color image using the irradiation of active energy rays, the dot diameter and the dot shape of the second ink in the multi-color image are more suitably maintained, and the color gamut of the multi-color image is further widened.

The polymerizable compound strengthens the multi-color image by being taken in between the particles when aggregated by coming in contact with the treatment liquid, and thereafter undergoing polymerization curing.

As the polymerizable compound, a water-soluble polymerizable compound is preferable.

Here, "water-soluble" means dissolvable in water at a fixed concentration or more. Specifically, the solubility with respect to water at 25° C. is preferably 5 mass % or more, more preferably 10 mass % or more, and even more preferably 15 mass % or more. In addition, the water-soluble polymerizable compound is preferably a polymerizable compound capable of dissolving (ideally uniformly) in an aqueous ink composition. In addition, the water-soluble polymerizable compound may be a polymerizable compound dissolving (ideally uniformly) in the ink composition after increasing the solubility by the addition of a water-soluble organic solvent to be described later.

As the polymerizable compound, in terms of not hindering the reaction between the aggregated components, the pigment, and the resin particles, a non-ionic or cationic polymerizable compound is preferable, and a polymerizable compound with a solubility with respect to water of 10 mass % or more (more preferably 15 mass % or more) is preferable.

In the present disclosure, the content of the polymerizable compound in the ink composition is preferably 15 mass % to 40 mass % with respect to the total mass of the ink composition. When the content of the polymerizable compound is 15 mass % or more, the adhesion with the recording medium is excellent and the scratch resistance of the image improves due to an improvement in the image strength. If the content of the polymerizable compound is 40 mass % or less, the grade difference (pile height) of the image is reduced and the scratch resistance and the glossiness are also excellent.

In particular, the content of the polymerizable compound is preferably in the range of 20 mass % to more and 35 mass % or less.

It is possible for the polymerizable compound to be contained as one type singly or two or more types in combination.

Examples of non-ionic polymerizable compounds include polymerizable compounds such as (meth)acryl monomers.

Examples of the (meth)acryl monomers include ultraviolet curable monomers and oligomers such as polyvalent alcohol (meth)acrylic acid ester, polyvalent alcohol glycidyl ether (meth)acrylic acid ester, polyethylene glycol (meth)acrylic acid ester, polyvalent alcohol ethylene oxide-added compound (meth)acrylic acid ester, and reactants between polybasic acid anhydride and hydroxyl-containing (meth)acrylic acid ester.

The polyvalent alcohol may be a polyvalent alcohol with a chain extended by an ethylene oxide chain on the inside by the addition of the ethylene oxide.

In addition, it is possible to use an acrylic ester which has two or more acryloyl groups in one molecule which is derived from a polyhydric compound. Examples of the polyhydric compounds include condensates of glycols, oligo ether, oligo esters, and the like.

Furthermore, as the non-ionic polymerizable compound, (meth)acrylic acid ester of a polyol having two or more hydroxyl groups such as a monosaccharide or a disaccharide or (meth)acrylic acid ester with triethanolamine, diethanolamine, tris hydroxymethyl amino methane, tris hydroxymethyl amino ethane, or the like is suitable.

In addition, as the non-ionic polymerizable compound, a water-soluble polymerizable compound (preferably a monomer compound) having an acrylamide structure in the molecule may be suitable used.

The compound represented by General Formula (1) described below is more preferable as the polymerizable compound having an acrylamide structure within the molecule.

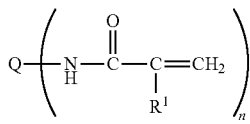

General Formula (1)

In General Formula (1), Q represents an n-valent group and $R^1$ represents a hydrogen atom or a methyl group. In addition, n represents an integer of 1 or more.

The compound represented by the General Formula (1) is a compound in which an unsaturated vinyl monomer binds to the group Q using an amide bond.

The $R^1$ represents a hydrogen atom or a methyl group, and is preferably a hydrogen atom.

The valent number n of the group Q is 1 or more from the viewpoint of improving permeability, polymerizing efficiency, and ejection stability, and in particular, 1 or more to 6 or less is preferable and 1 to more to 4 or less is more preferable.

In the present disclosure, from the viewpoint of being advantageous in terms of increasing the polymerization and the polymerization efficiency when curing an image using ultraviolet radiation or increasing the abrasion resistance and scratch resistance of the image, a polyfunctional (meth)acrylamide of which n≥2 is preferably contained.

In a case where the polyfunctional (meth)acrylamide is contained, based on mass, the content of the polyfunctional (meth)acrylamide in the ink composition is preferably 3 mass % to 30 mass % with respect to the total amount of the ink composition, and 5 mass % to 20 mass % is more preferable.

In addition, a monofunctional (meth)acrylamide of which n=1 is preferable from the point that the permeability to the pigment layer (coating layer) of the coated paper suitable used as the recording medium is high. In a case where the monofunctional (meth)acrylamide is contained, the content of the monofunctional (meth)acrylamide in the ink composition is more preferably 10% or more in the mass ratio with respect to the total amount of the ink composition.

In the present disclosure, an aspect combining the use of monofunctional (n=1) (meth)acrylamide having excellent permeability into a pigment layer in the coater paper, and the polyfunctional (n≥2) (meth)acrylamide having excellent polymerization and polymerization efficiency is more preferable.

In the General Formula (1), the group Q in a case where n=1 is not particularly limited as long as it is a monovalent group which can be linked with the (meth)acrylamide structure. The group Q in a case where n=1 is preferably selected from a group having water solubility. Specifically, examples thereof includes a monovalent residue in which one or more hydrogen atoms or hydroxyl groups are removed from a compound selected from a compound group X below.

—Compound Group X—

Ethylene glycol, diethylene glycol, triethylene glycol, polyethylene glycol, propylene glycol, dipropylene glycol, tripropylene glycol, polypropylene glycol, 1,3-propanediol, 1,2-butandediol, 1,3-butanediol, 1,4-butanediol, 2,3-butanediol, 1,5-pentanediol, 1,4-pentanediol, 2,4-pentanediol, 3-methyl-1,5-pentane diol, 2-methyl-2,4-pentane diol, 1,5-hexanediol, 1,6-hexanediol, 2,5-hexanediol, glycerin, 1,2,4-butane triol, 1,2,6-hexane triol, 1,2,5-pentane triol, thio glycol, trimethylpropane, ditrimethylpropane, trimethylol ethane, ditrimethylol ethane, neopentyl glycol, pentaerythritol, dipentaerythritol, and condensates thereof, polyol compounds such as low molecular-weight polyvinyl alcohols or sugars, and polyamine compounds such as ethylenediamine, diethylenetriamine, triethylenetetramine, polyethyleneimine, and polypropylene diamine.

In addition, as the group Q in a case where n≥2, a substituted or unsubstituted alkylene group having 4 or less carbon atoms, such as methylene, ethylene, propylene, and butylene groups, a divalent or higher linking group having a saturated or unsaturated heterocyclic ring (pyridine ring, imidazole ring, pyrazine ring, piperidine ring, piperazine ring, morpholine ring, or the like), as well as a divalent or higher residue of a polyol compound including an oxyalkylene group (preferably an oxyethylene group), and a divalent or higher residue of a polyol compound including three or more oxyalkylene groups (preferably oxyethylene groups), can be exemplified.

Below, specific examples of the water-soluble polymerizable compounds having an acrylamide structure in the molecule are shown. However, the present disclosure is not limited thereto.

Polymerizable compound 1

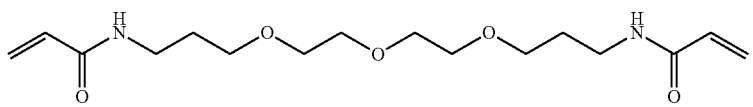

Polymerizable compound 2

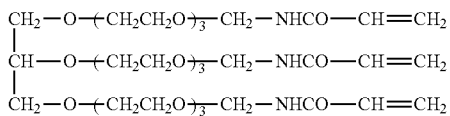

Polymerizable compound 3

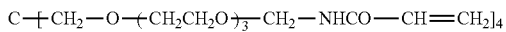

Polymerizable compound 4

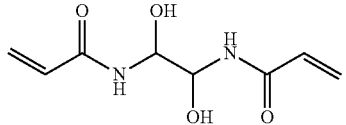

Polymerizable compound 5

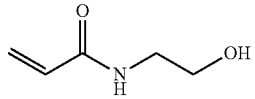

-continued
Polymerizable compound 6
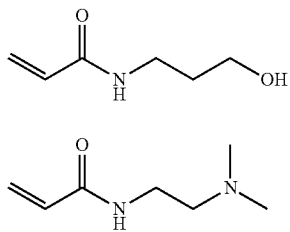
Polymerizable compound 7
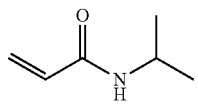
Polymerizable compound 8
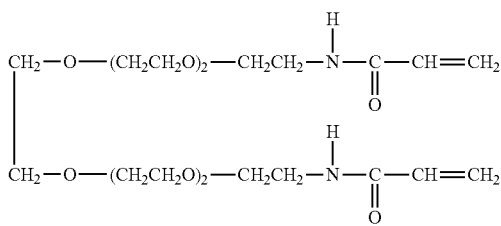
Polymerizable compound 9
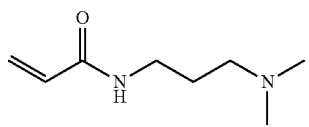
Polymerizable compound 10
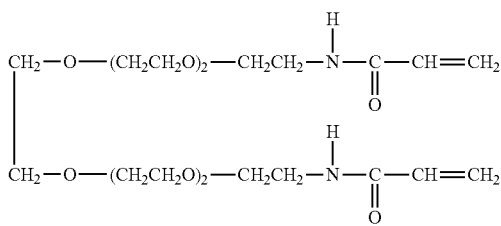
Polymerizable compound 11
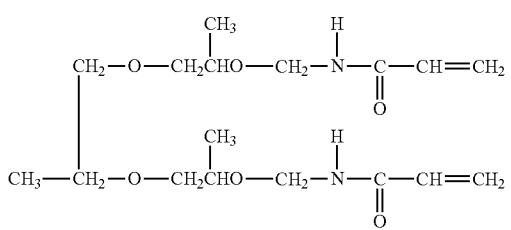
Polymerizable compound 12
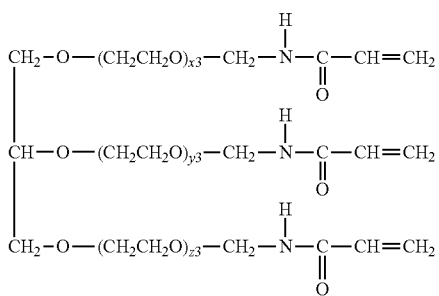
$x_3 + y_3 + z_3 = 6$
Polymerizable compound 13
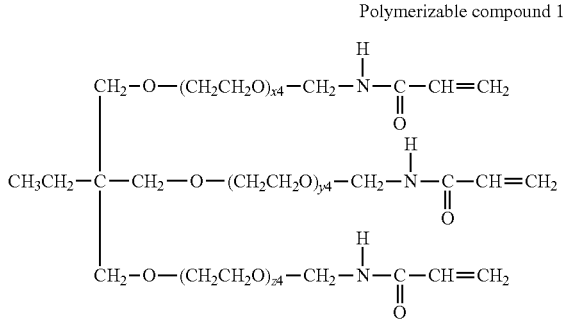
$x_4 + y_4 + z_4 = 9$
Polymerizable compound 14
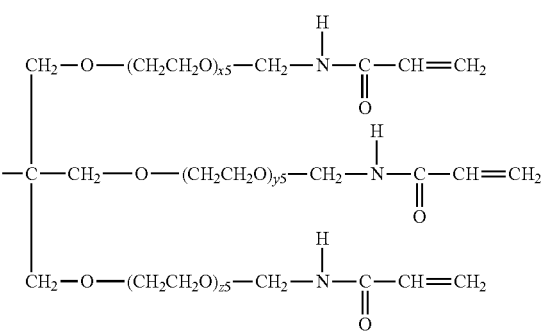
$w_5 + x_5 + y_5 + z_5 = 6$
Polymerizable compound 15
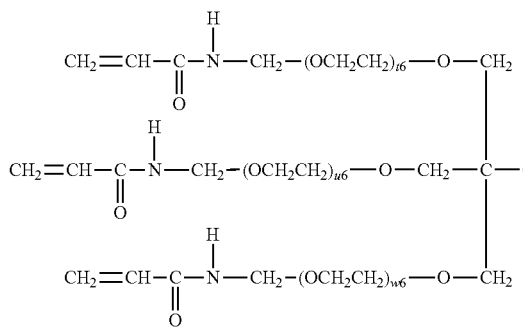 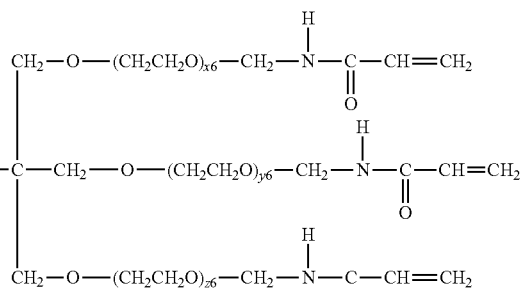
$t_6 + u_6 + w_6 + x_6 + y_6 + z_6 = 12$ Polymerizable compound 16

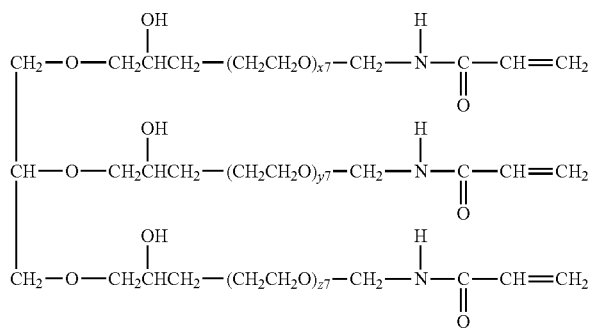

$x_7 + y_7 + z_7 = 3$

Polymerizable compound 17

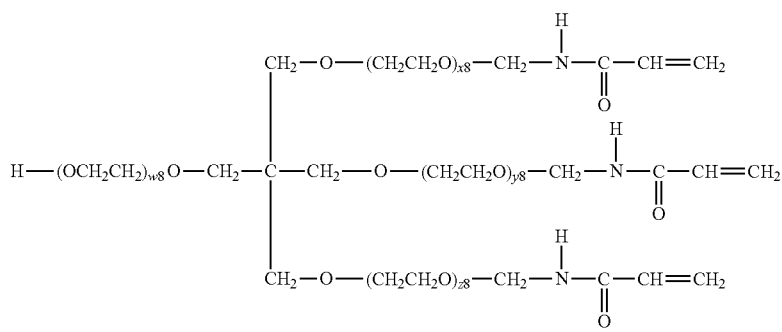

$w_8 + x_8 + y_8 + z_8 = 6$

Polymerizable compound 18

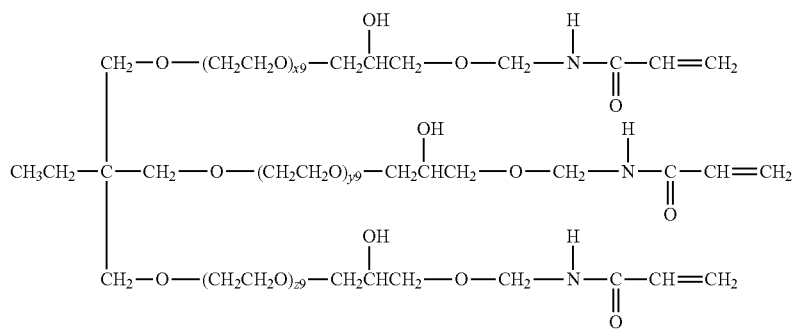

$x_9 + y_9 + z_9 = 3$

In addition, as the polyfunctional (meth)acrylamide, the compound represented by the following General Formula (2) is preferable in terms of providing high polymerizability and curability. This compound has four acrylamide groups or methacrylamide groups as a polymerizable group in the molecule. In addition, for example, this compound exhibits curability based on a polymerization reaction according to the application of active energy rays such as α-rays, γ-rays, x-rays, ultraviolet rays, visible light rays, infrared light rays, or an electron beam, or energy such as heat. The compound represented by the following General Formula (2) is a compound exhibiting water solubility and dissolving well in a water-soluble organic solvent, such as water or alcohol. In addition, by including the compound represented by the following General Formula (2) as the polymerizable compound in the first ink composition, it is easy to adjust the φ2/φ1 according to a range of 0.90 or more to 1.10 or less.

General Formula (2)

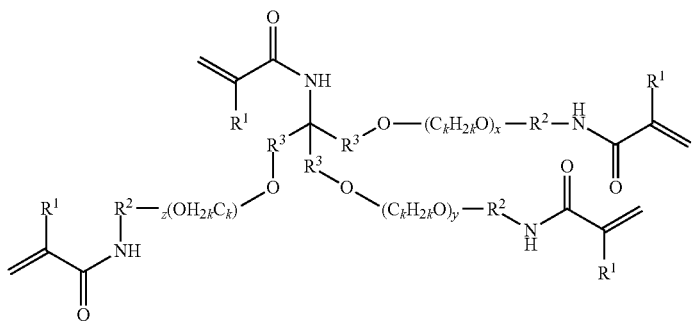

In the General Formula (2), $R^1$ represents a hydrogen atom or a methyl group, and is preferably a hydrogen atom. A plurality of $R^1$ may be the same or different from each other.

$R^2$ represents a linear or branched alkylene group having 2 to 4 carbon atoms. A plurality of $R^2$ may be the same or different from each other. $R^2$ is preferably an alkylene group having 3 to 4 carbon atoms, more preferably an alkylene group having 3 carbon atoms, and particularly preferably a linear alkylene group having 3 carbon atoms. The alkylene group of $R^2$ may also have a substituent, and examples of the substituent include an aryl group, an alkoxy group, or the like.

However, in $R^2$, the oxygen atoms and nitrogen atoms bonded to both ends of the $R^2$ do not have a structure which is bonded to the same carbon atom of $R^2$. $R^2$ is a linear or branched alkylene group linking the oxygen atoms and nitrogen atoms of the (meth)acrylamide group. Here, in a case where the alkylene group has a branched structure, it is considered that the oxygen atoms and nitrogen atoms of the (meth)acrylamide group at both ends take and —O—C—N— structure (hemiaminal structure) bonded to the same carbon atom in the alkylene group; however, the compound represented by General Formula (2) does not include a compound of such a structure. The compound having the —O—C—N— structure in the molecule is not preferable in terms of factors such as that, since degradation easily occurs at the position of the carbon atom, degradation easily occurs during storage, and the storage stability is decreased in a case where the ink composition is contained.

$R^3$ represents a divalent linking group. Examples of the divalent linking group represented by $R^3$ include an alkylene group, an arylene group, a heterocyclic group, a group formed of a combination of these, or the like, and an alkylene group is preferable. Here, in a case where the divalent linking group includes an alkylene group, at least one type of group selected from —O—, —S—, and —NR$^4$— may be further included in the alkylene group. $R^3$ represents a hydrogen atom or an alkyl group having 1 to 4 carbon atoms.

In a case where $R^3$ includes an alkylene group, examples of the alkylene group include a methylene group, an ethylene group, a propylene group, a butylene group, a pentylene group, a hexylene group, a heptylene group, an octylene group, a nonylene group, or the like. The alkylene group of $R^3$ preferably has 1 to 6 carbon atoms, more preferably 1 to 3, and particularly preferably 1. In the alkylene group of $R^3$, at least one type selected from —O—, —S—, and —NR$^a$— may be further included. Examples of the alkylene group including —O— include —C$_2$H$_4$—O—C$_2$H$_4$—, —C$_3$H$_6$—O—C$_3$H$_6$—, and the like. The alkylene group of $R^3$ may also have a substituent, and examples of the substituent include an aryl group, an alkoxy group, or the like.

In a case where $R^3$ includes an arylene group, examples of the arylene group include a phenylene group, a napthylene group and the like, and the number of carbon atoms of $R^3$ is preferably 6 to 14, more preferably 6 to 10, and particularly preferably 6. The arylene group of $R^3$ may also have a substituent, and examples of the substituent include an alkyl group, an alkoxy group, or the like.

In a case where $R^3$ includes a heterocyclic group, as the heterocyclic group, a 5-membered or 6-membered heterocyclic group is preferable, and these may be further condensed. In addition, the heterocycle may be an aromatic heterocycle or a non-aromatic heterocycle. Examples of the heterocyclic group include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline, and the like. Among these, an aromatic heterocyclic group is preferable, and pyridine, pyrazine, pyrimidine, pyridazine, triazine, pyrazole, imidazole, benzimidazole, triazole, thiazole, benzothiazole, isothiazole, benzisothiazole, and thiadiazole are preferable. Here, the heterocyclic groups given in the above description have been given in a form in which the substitution position is omitted; however, the substitution position is not limited. For example, for pyridine, substitution at the 2-position, 3-position, and 4-position is possible and it is possible to include all these substitutions.

The heterocyclic group may also have a substituent, and examples of the substituent include an alkyl group, an aryl group, and alkoxy group, or the like.

k in the General Formula (2) represents 2 or 3. A plurality of k may be the same or different from each other. In addition, $C_kH_{2k}$ may be a linear structure or a branched structure.

In addition, x, y, and z each independently represent integers of 0 to 6, preferably integers of 0 to 5, and more preferably integers of 0 to 3, x+y+z satisfies 0 to 18, preferably satisfies 0 to 15, and more preferably satisfies 0 to 9.

Specific examples of the compound represented by General Formula (2) are shown below. However, the present disclosure is not limited thereto.

Polymerizable compound a
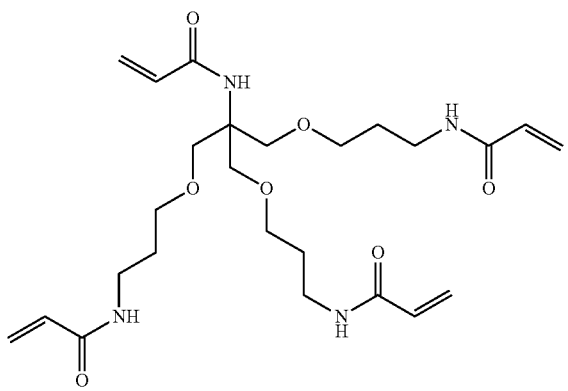
Polymerizable compound b
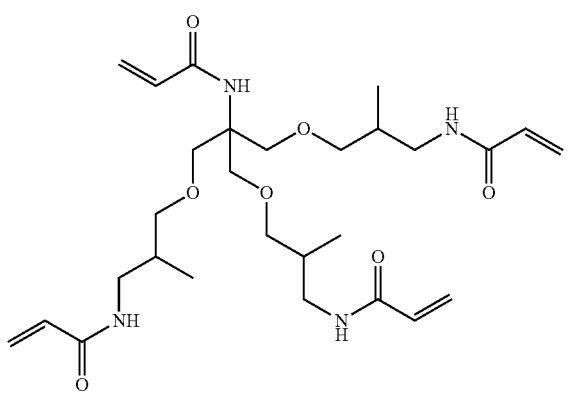
Polymerizable compound c
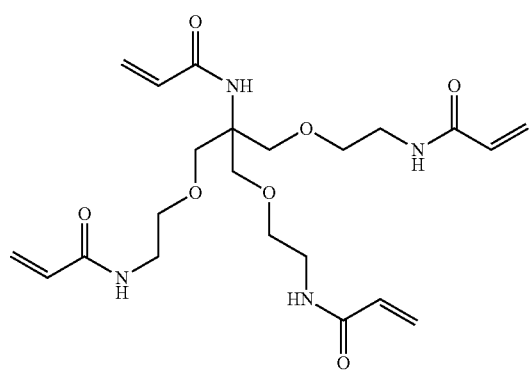
Polymerizable compound d
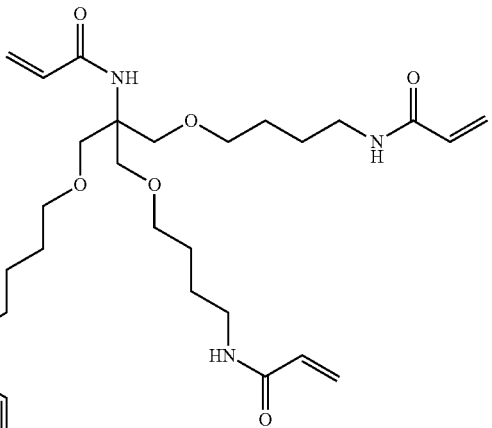
Polymerizable compound e
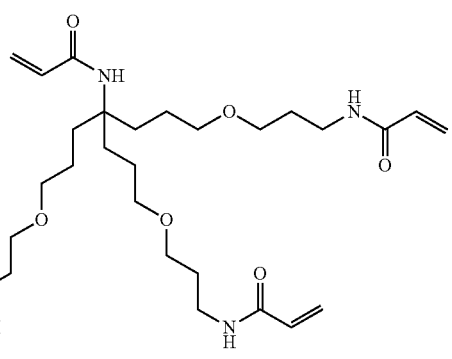
Polymerizable compound f
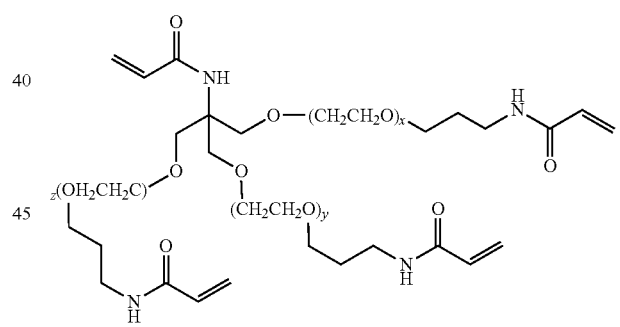
x + y + z = 9
The compound represented by the General Formula (2) can be prepared according to the following Scheme 1 or Scheme 2, for example.
Scheme 1
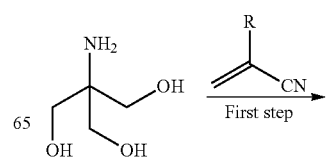
First step

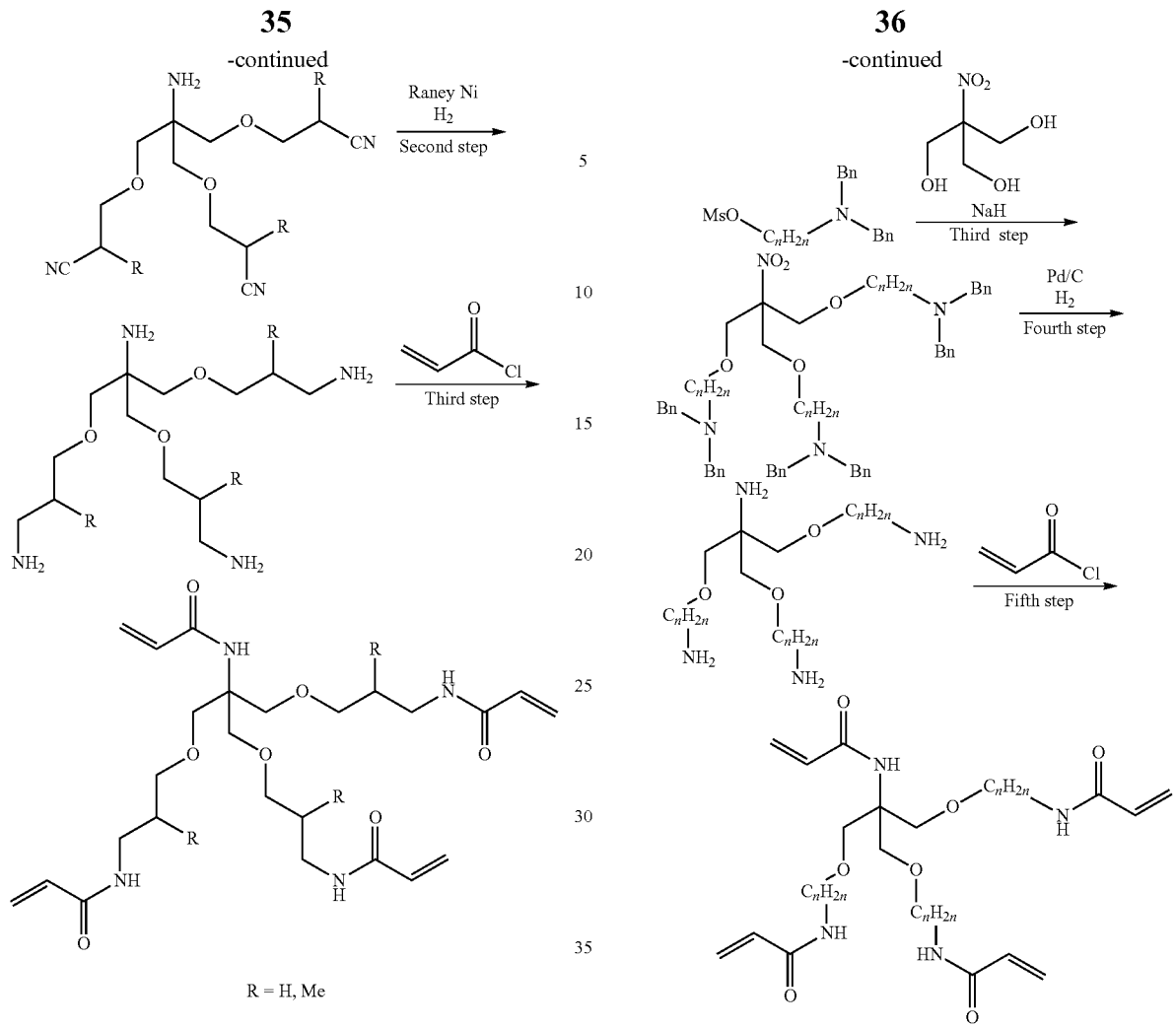

R = H, Me

In Scheme 1, the first step is a step of obtaining a polycyano compound by a reaction of acrylonitrile and trishydroxymethylaminomethane. The reaction in this step is preferably performed at 3 to 60° C. for 2 to 8 hours.

The second step is a step of reacting the polycyano compound with hydrogen in the presence of a catalyst and obtaining a polyamine compound by a reduction reaction. The reaction in this step is preferably performed at 20 to 60° C. for 5 to 16 hours.

The third step is a step of obtaining a polyfunctional acrylamide compound by an acylating reaction of the polyamine compound and acrylic acid chloride or methacrylic chloride. The reaction in this step is preferably performed at 3 to 25° C. for 1 to 5 hours. Here, instead of acrylic acid chloride, the acylating agent may use diacrylate anhydride or dimethacrylic anhydride. Here, in the acylation step, by using both acrylic acid chloride and methacrylic acid chloride, it is possible to obtain a compound having an acrylamide grou and methacrylamide group in the same molecule as the final product.

Scheme 2

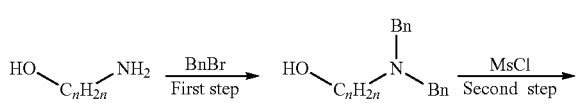

In the Scheme 2, the first step is a step of obtaining a nitrogen protected amino alcohol compound by a protective group introduction reaction according to a benzyl group, a benzyloxycarbonyl group, or the like in a nitrogen atom of an amino alcohol. The reaction in this step is preferably performed at 3 to 25° C. for 3 to 5 hours.

The second step is a step of introducing a leaving group such as methanesulfonyl group, a p-toluenesulfonyl group, or the like into an OH group of a nitrogen protected amino alcohol compound, and obtaining a sulfonyl compound. The reaction in this step is preferably performed at 3 to 25° C. for 2 to 5 hours.

The third step is a step of obtaining an amino alcohol adduct compound by an SN2reaction of the sulfonyl compound and tris hydroxymethyl nitro methane. The reaction in this step is preferably performed at 3 to 70° C. for 5 to 10 hours.

The fourth step is a step of reacting the amino alcohol adduct compound with hydrogen in the presence of a catalyst and obtaining a polyamine compound by a hydrogenation reaction. The reaction in this step is preferably performed at 20 to 60° C. for 5 to 16 hours.

The fifth step is a step of obtaining a polyfunctional acrylamide compound by an acylating reaction of the polyamine compound and acrylic acid chloride or methacrylic chloride. The reaction in this step is preferably performed at 3 to 25° C. for 1 to 5 hours. Here, instead of acrylic acid chloride, the acylating agent may use diacrylate anhydride or dimethacrylic anhydride. Here, in the acylation step, by using both acrylic acid chloride and methacrylic acid chloride, it is possible to obtain a compound having an acrylamide group and methacrylamide group in the same molecule as the final product.

The compound obtained through the above-described steps is obtained by purification of the reaction product solution by a conventional method. For example, it is possible to perform purification by liquid separation and extraction using an organic solvent, crystallization using a poor solvent, column chromatography using silica gel, or the like.

The cationic polymerizable compound is a compound that has a cationic group and a polymerizable group such as an unsaturated double bond, and for example, epoxy monomers or oxetane monomers can be suitably used. If the cationic polymerizable compound is contained, the cationic property of the ink composition is strengthened by having a cationic group, and mixing of colors when an anionic ink is used is prevented more effectively.

Examples of the cationic polymerizable compound include N,N-dimethyl amino ethyl methacrylate, N,N-dimethyl amino ethyl acrylate, N,N-dimethyl amino propyl methacrylate, N,N-dimethyl amino propyl acrylate, N,N-dimethyl amino acrylamide, N,N-dimethyl amino methacrylamide, N,N-dimethyl amino ehtyl acrylamide, N,N-dimethyl amino ethyl methacrylamide, N,N-dimethylaminopropyl acrylamide, N,N-dimethyl amino propyl methacrylamide, quaternary compounds thereof, and the like.

Examples of epoxy monomers include polyvalent alcohol glycidyl ether, glycidyl ester, aliphatic cyclic epoxide, and the like.

(Polymerization Initiator)

It is possible for at least one of the ink composition in the present disclosure and the treatment liquid to be described later to contain at least one type of polymerization initiator. In this manner, it is possible to initiate the polymerization of the polymerizable compound using active energy rays.

The polymerization initiator can be used alone as a single type, or two or more types can be mixed. In addition, the polymerization initiator may be used in combination with a sensitizer.

In the present disclosure, the polymerization initiator may be contained in the ink composition, the treatment liquid, or both, but an aspect where the polymerization initiator is contained in at least the ink composition is preferable from the point of the polymerization reaction and the curing, and subsequently, the viewpoint of an effect of improving the adhesion and the scratch resistance of the image.

It is possible for a compound, which is able to initiate a polymerization reaction of the polymerizable compound using active energy rays, to be appropriately selected and contained in the polymerization initiator. Examples of polymerization initiators include polymerization initiators (for example, photopolymerization initiators and the like) generating active species (radicals, acids, bases, and the like) using radiation, light, or electron beams.

Examples of the photopolymerization initiator include acetophenone, 2,2-diethoxacetophenone, p-dimethyl amino acetophenone, p-dimethyl amino propiophenone, benzophenone, 2-chloro benzophenone, p,p'-dichloro-benzophenone, p,p'-bis-diethylamino benzophenone, Michler ketone, benzyl, benzoin, benzoin methyl ether, benzoin ethyl ether, benzoin isopropyl ether, benzoin n-propyl ether, benzoin isobutyl ether, benzoin n-butyl ether, benzyl dimethyl ketal, tetra thiuram mono methyl sulfide, thioxanthone, 2-chloro thioxanthone, 2-methyl thioxanthone, asobisisobutyronitrile, benzoin peroxide, di-tert-butyl peroxide, 1-hydroxycyclohexyl phenyl ketone, 1-[4-(2-hydroxy-ethoxy)-phenyl]-2-hydroxy-2-methyl-1-propane-1-one, 2-hydroxy-2-methyl-1-phenyl-1-one, 1-(4-isopropyl-phenyl)-2-hydroxy-2-methyl propane-1-one, and methylbenzoyl formate. In addition, examples include aromatic diazonium salts, aromatic haonium salts, aromatic sulfonium salts, metallocene compounds, and the like of triphenylsulfonium hexafluorophosphate and diphenyliodonium hexafluorantimonate, and the like.

In a case where the ink composition contains the polymerization initiator, the content of the polymerization initiator in the ink composition is preferably 1 to 40 mass % with respect to the polymerizable compound and more preferably 5 to 30 mass %. When the content of the polymerization initiator is 1 mass % or more, the scratch resistance of the image is further improved, which is advantageous for high speed recording and when the content of the polymerization initiator is 40 mass % or less, it is advantageous in terms of the point of ejection stability.

Examples of the sensitizer include amine-based compounds (amines including aliphatic amines, aromatic groups, piperidine, and the like); ureas (allyl-based, o-tolythio ureas, and the like); sulfur compounds (sodium diethyl dithiophosphate, soluble salt of aromatic sulfinic acid, and the like); nitrile compounds (N,N, disubstituted p-amino benzonitrile, and the like); phosphorous compounds (tri-n-butyl phosphine, sodium diethyldithio phosphide, and the like); nitrogen compounds (Michler ketone, N-nitroso hydroxylamine derivatives, oxazolidine compounds, tetrahydro 1,3 compounds, formaldehyde, acetaldehyde and condensates of diamines, and the like), chlorine compounds (carbon tetrachloride hexachloroethane, and the like); polymerized amines of the reaction product of epoxy resin and amine; triethanolamine triacrylate; and the like.

The sensitizer can be contained in a range which does not impair the effects of the present disclosure.

(Water-Soluble Organic Solvent)

The ink composition of the present disclosure may contain at least one type of water-soluble organic solvent.

As the water-soluble solvent, for example, known water-soluble organic solvents disclosed in paragraphs 0124 to 0135 of JP2011-074150A, paragraphs 0115 to 0128 of JP2011-042150A, paragraphs 0104 to 0119 of JP2011-079901A, or the like can be used.

In a case where the ink composition in the present disclosure contains a water-soluble organic solvent, the content thereof with respect to the total amount of the ink composition is preferably 40 mass % or less, more preferably 20 mass % or less, still more preferably 10mass % or less, and less than 3 mass % is particularly preferable. Here, in the present disclosure, that the content of the water-soluble organic solvent is less than 3 mass % signifies that the water-soluble organic solvent is not actively contained in the ink composition, and most preferably, that the water-soluble organic solvent is not contained (content: 0 mass %).

(Surfactant)

The ink composition of the present disclosure may include at least one type of surfactant according to necessity. The surfactant can be used as a surface tension adjusting agent, for example.

As the surfactant, it is possible to effectively us a compound of the like having a structure having a combination of a hydrophilic part and a hydrophobic part in the molecule, and it is possible to use any of anionic surfactants, cationic surfactants, amphoteric surfactants, non-ionic surfactants, and betaine-based surfactants. In addition, the above-described water-soluble polymer (polymer dispersing agent) may be used as the surfactant.

In the present disclosure, from the viewpoint of suppressing interference with the ink droplet landing, a non-ionic surfactant is preferable, and, among these, an acetylene glycol derivatives (acetylene glycol-based surfactants) are more preferable.

Examples of acetylene glycol-based surfactants include 2,4,7,9-tetramethyl-5-decyne-4,7-diol and alkylene oxide adducts or the like of 2,4,7,9-tetramethyl-5-decyne-4,7-diol, and it is preferable that the surfactant be at least one type selected therefrom. Examples of commercially available products of these compounds include the E series such as Olfine E1010 by Nissin Chemical Industry.

When the surfactant (surface tension adjusting agent) is contained in the ink composition, from the viewpoint of favorably performing ejection of the ink composition with an ink jet method, the surfactant is preferably contained in an amount of a range which can adjust the surface tension of the ink composition to 20 to 60 mN/m. In terms of surface tension, the surfactant is more preferably contained in an amount of a range which can adjust the surface tension to 20 to 45 mN/m, and even more preferably contained in an amount of a range which can adjust the surface tension to 25 to 40 mN/m.

When the ink composition of the present disclosure includes the surfactant, the specific amount of surfactant is not particularly limited; however, with respect to the total mass of the ink composition, 0.1 mass % or more is preferable, 0.1 to 10 mass % is more preferable, and 0.2 to 3 mass % is even more preferable.

(Other Components)

It is possible for the ink composition in the present disclosure to be configured to use other additives other than the above-described components. Examples of the other additives include known additives such as a polymerization inhibitor, an anti-drying agent (wetting agent), and anti-fading agent, an emulsion stabilizer, a permeation enhancer, an ultraviolet absorbing agent, a preservative, a fungicide, a pH adjusting agent, an surface tension adjusting agent, an anti-foaming agent, a viscosity adjusting agent, a dispersion stabilizer, an anti-rust agent, a chelating agent, or the like. While these various additives are generally added directly to the ink in the case of the ink composition and added to a dispersant after a dye dispersant is prepared in a case where an oil-based dye is used as a dispersant, the additives may be added to an oil phase or an aqueous phase during the preparation.

(Preferable Physical Properties of Ink Composition)

The surface tension (25° C.) of the ink composition in the present disclosure is not particularly limited; however, 20 mN/m or more to 60 mN/m or less is preferable. The surface tension is more preferably 20 mN/m or more to 45 mN/m or less, and even more preferably 25 mN/m or more to 40 mN/m or less. The surface tension of the ink composition was measured under conditions of 25° C. using an Automatic Surface Tensiometer CBVP-Z (manufactured by Kyowa Interface Science Co., Ltd.)

In addition, the viscosity of the ink composition in the present disclosure is not particularly limited; however, the viscosity at 25° C. is preferably 1.2 mPa·s or more to 15.0 mPa·s or less, more preferably 2 mPa·s or more to less than 13 mPa·s, and even more preferably 2.5 mPa·s or more to less than 100 mPa·s. The viscosity of the ink composition was measured under conditions of 25° C. using a VISCOMETER TV-22 (manufactured by TOKI SANGYO CO., LTD).

<Treatment Liquid>

Below, description will be given of the treatment liquid used in the treatment liquid application step in the present disclosure.

The treatment liquid in the present disclosure contains at least one type of aggregation component capable of aggregating the components in the ink composition (first ink composition and second ink composition, same applies below) for forming the image. It is possible for the treatment liquid to be configured using other further components according to necessity.

By forming an image using the treatment liquid along with the ink composition, it is possible to speed up the ink jet recording, and in addition, it is possible to obtain an image in which the drawing property (for example, the reproduction of fine lines and ultra-fine portions) is excellent with high density and resolution even with high speed recording.

The aggregation component may be a compound which is able to change the pH of the ink composition, may be a multivalent metal salt, or may be a cationic polymer. In the present disclosure, from the viewpoint of the aggregability of the ink composition, a compound that can change the pH of the ink composition is preferable, and a compound that can decrease the pH of the ink composition is more preferable.

Examples of the compound which is able to decrease the pH of the ink composition can include an acid (acidic substance).

Suitable examples of the acids include sulfuric acid, hydrochloric acid, nitric acid, phosphoric acid, polyacrylic acid, acetic acid, glycolic acid, malomic acid, malic acid, maleic acid, ascorbic acid, succinic acid, glutaric acid, fumaric acid, citric acid, tararic acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, or derivatives or salts thereof, and the like.

In the case where the treatment liquid includes the acid, the pH of the treatment liquid (25° C.) is preferably 6 or less, the pH is more preferably 4 or less, is even more preferably in the range of 1 to 4, and the pH is particularly preferably 1 to 3. At this time, the pH (25° C.) of the ink composition is preferably 7.5 or more (more preferably 8.0 or more).

In particular, from the viewpoints of image density, resolution, and higher-speed ink jet recording, a case where the pH of the ink composition (25° C.) is 8.0 or more and the pH of the treatment liquid (25° C.) is 0.5 to 4 is preferable.

In particular, an acid with high water solubility is preferable as the aggregation component of the present disclosure, and in terms of increasing the aggregability and fixing the entirety of the ink, an organic acid is preferable, a divalent or higher organic acid is more preferable, and an acidic substance with two valences or more and three valences or less is particularly preferable. As the divalent or higher organic acid, an organic acid having a first pKa of 3.5 or less is preferable, and an organic acid having 3.0 or less is more preferable. Specifically, suitable examples include phosphoric acid, oxalic acid, malonic acid, citric acid and the like.

As the polyvalent metal salts and cationic polymers which can be used as an aggregation component, for example, it is possible to use the polyvalent metal salts and cationic polymers disclosed in paragraphs 0155 to 0156 of JP201-04250A.

The aggregation component can be used alone as a single type, or two or more types can be mixed.

The content of the aggregation component in the treatment liquid is preferably 1 to 50 mass %, more preferably 3 to 45 mass %, and even more preferably within a range of 5 to 40 mass %.

In addition, as mentioned above, it is possible for at least one of the treatment liquid and the previously described ink composition in the present disclosure to contain at least one type of polymerization initiator. A preferable range for the polymerization initiator is as described above.

In addition, the treatment liquid may further contain other additives as other components in a range which does not deteriorate the effect of the present disclosure. Examples of the other additives include known additives such as a drying prevention agent (lubricating agent), and anti-fading agent, an emulsion stabilizer, a permeation enhancer, an ultraviolet absorbing agent, a preservative, a fungicide, a pH adjusting agent, a surface tension adjusting agent, an anti-foaming agent, a viscosity adjusting agent, a dispersing agent, a Dispersion stabilizer, and anti-rust agent, or a chelating agent.

EXAMPLES

Below, the present disclosure will be specifically described using examples, however, the present disclosure is not limited to the following examples as long as it does not exceed the gist thereof. Here, "parts" and "%" are by mass unless otherwise specified.

Examples 1 to 42

<<Preparation of Ink Composition>>
In the following manner, cyan ink and yellow ink were respectively prepared as the first ink composition (below referred to as "ink 1") and the second ink composition (below referred to as "ink 2").
<Preparation of Cyan Ink (Ink 1)>
(Preparation of Cyan Dispersion Solution C1)
6 parts of styrene, 11 parts of stearyl methacrylate, 4 parts of STYRENE MACROMER AS-6 (trade name, manufactured by Toagosei Co., Ltd.), 5 parts of BLEMMER PP-500 (trade name, manufactured by Nippon Oil & Fats Co., Ltd.), 5 parts of methacrylic acid, 0.05 parts of 2-mercaptoethanol and 24 parts of methyl ethyl ketone were added to a reaction vessel to prepare a mixed solution.

On the other hand, 14 parts of styrene, 24 parts of stearyl methacrylate, 9 parts of STYRENE MACROMER AS-6 (trade name, manufactured by Toagosei Co., Ltd.), 9 parts of BLEMMER PP-500 (trade name, manufactured by Nippon Oil & Fats Co., Ltd.), 10 parts of methacrylic acid, 0.13 parts of 2-mercaptoethanol, 56 parts of methyl ethyl ketone and 1.2 parts of 2,2'-asobis(2,4-dimethylvaleronitrile) were added to a dropping funnel to prepare a mixed solution.

Then, the mixed solution in the reaction vessel was heated to 75° C. under a nitrogen atmosphere while being stirred and the mixed solution in the dropping funnel was gradually dropped over 1 hour to the reaction vessel. Two hours after the completion of the dropping, a solution in which 1.2 parts of 2,2'-azobis(2,4-dimethylvaleronitrile) were dissolved in 12 parts of methyl ethyl ketone was dropped over 3 hours, followed by further aging for 2 hours at 75° C. and for 2 hours at 80° C., whereby a polymer dispersing agent solution was obtained.

A solid content was separated by removing a solvent from a part of the resulting polymer dispersing agent solution and the obtained solid content was diluted to 0.1% by mass with tetrahydrofuran, followed by measuring the weight average molecular weight using a high speed GPC (gel permeation chromatography) HLC-8220GPC with three of TSKgel Super HZM-H, TSKgel, Super HZ4000 and TSKgel, Super HZ2000 (manufactured by Tosoh Corporation) connected in series. As the result, the weight average molecular weight was 25,000 on polystyrene conversion. In addition, the acid value was 80 mgKOH/g.

Next, 5.0 g of the above-described polymer dispersing agent solution by solid content conversion, 10.0 g of cyan pigment Pigment Blue 15.3 (manufactured by Dainichiselka Color and Chemicals Mfg. Co., Ltd., 40.0 g of methyl ethyl ketone, 8.0 g of 1 mol/L (liter, same applies below) sodium hydroxide aqueous solution, and 82.0 g of ion exchange water, along with 300 g of 0.1 mm zirconia beads were supplied to a vessel, and dispersed at 1000 rpm for 6 hours using a ready mill disperser (manufactured by Aimex Co., Ltd.). The obtained dispersion solution was subjected to reduced pressure condensation with an evaporator until the methyl ethyl ketone could be sufficiently distilled away, then further condensed until the density of a water dispersible pigment reached 10% by mass, whereby a cyan dispersion solution C1 in which the water dispersible pigment was dispersed was prepared.

A volume average particle diameter (secondary particle) of the obtained cyan dispersion solution C1 was 77 nm when measured using a dynamic light scattering method with a Microtrac particle size distribution measurement apparatus (Version 10.1.2-211BH (trade name) manufactured by Nikkiso. Co., Ltd.).

(Synthesis of Self-Dispersible Polymer Microparticles (Polymer Particles))
In a 2 liter three-necked flask provided with an stirrer, a thermometer, a reflux condenser and a nitrogen gas introducing tub, 360.0 g of methyl ethyl ketone was added thereto, followed by heating up to 75° C. Thereafter, maintaining the temperature inside the flask at 75° C., a mixed solution formed of 180.0 g of phenoxyethyl acrylate, 162.0 g of methyl methacrylate, 18.0 g of acrylic acid, 72 g of methyl ethyl ketone and 1.44 g of "V-601" (manufactured by Wako Pure Chemical Industries, Ltd., dimethyl 2,2'-azobis (2-methyl propionate)) was dropped at a constant speed so that the dropping was completed in two hours. After the completion of the dropping, a solution formed of 0.72 g of "V-601" and 36.0 g of methyl ethyl ketone was added thereto, followed by stirring at 75° C. for 2 hours, further followed by adding a solution formed of 0.72 g of "V-601" and 36.0 g of isopropanol and stirring at 75° C. for 2 hours. Thereafter, heating was performed to 85° C. and stirring was further continued for 2 hours, whereby a phenoxyethyl acrylate/methyl methacrylate/acrylic acid (=50/45/5 [mass ratio]) copolymer resin solution was obtained.

The weight average molecular weight (Mw) of the obtained copolymer was measured in the same manner as described above and was 64,000 (calculated by polystyrene conversion using gel permeation chromatography (GPC)) and the acid value was 38.9 mgKOH/g.

Next, 668.3 g of the obtained resin solution was weighed, 388.3 g of isopropanol and 145.7 ml of 1 mol/L NaOH aqueous solution were added thereto and the temperature inside the reaction vessel was raised to 80° C. Next, 720.1 g of distilled water was dropped at a speed of 20 ml/minute to the solution after the heating to perform water dispersion, subsequently the temperature inside the reaction vessel was kept at 80° C. for 2 hours under atmospheric pressure, at 85° C. for 2 hours and at 90° C. for 2 hours. Subsequently, the inside of the reaction vessel was depressurized to distil away a total of 913.7 g of isopropanol, methyl ethyl ketone and distilled water, whereby an aqueous dispersion of self-dispersing polymer microparticles P-1 (polymer particles) having a solid content density (polymer particle density) of 28.0 mass % was obtained.

(Preparation of Cyan Ink)

After mixing the following composition and performing filtration with a glass filter (GS-25) manufactured by ADVANTEC, filtration with a filter (PVDF film, pore diameter 5 μm) manufactured by Millipore Co., Ltd. was performed to obtain a cyan ink.

—Composition of Cyan Ink—

Cyan dispersion solution C1 (density of water dispersible pigment: 10 mass %) 20 mass %

Hydroxyethyl acrylamide (above-described polymerizable compound 5 (monofunctional polymerizable compound)) 12 mass %

Non-ionic polymerizable compound (above-described polymerizable compound 1 (bifunctional polymerizable compound)) 8 mass %

Sunnix GP250 (manufactured by Sanyo Chemical Industries, Ltd.; hydrophilic organic solvent) 2 mass %

Olfine-E1010 (manufactured by Nissin Chemical Industry Co., Ltd.; surfactant) 1 mass %

Irgacure-2959 (manufactured by BASF, photopolymerization initiator) 3 mass %

Aqueous dispersion of self-dispersible polymer microparticles P-1 (polymer particles) amount in which content of the polymer particles with respect to the entirety of the cyan ink is the content shown in Table 1

Ion exchange water remaining amount bringing the total to 100 mass %

<Preparation of Yellow Ink (Ink 2)>

Yellow ink was prepared in the same manner as the preparation of the cyan ink except that, in the preparation of the above-described cyan ink, the cyan pigment Pigment Blue 15:3 was changed to the same amount of yellow pigment Pigment Yellow 74 (manufactured by Dainichiseika Color & Chemicals Mfg. Co., Ltd.)

However, the content of the self-dispersible polymer microparticles P-1 (polymer particles) with respect to the yellow ink was set to 3.0 mass %.

<<Preparation of Treatment Liquid>>

Components having the following composition were mixed and the treatment liquid was prepared.

—Composition of Treatment Liquid—

Malonic acid (manufactured by Wako Pure Chemical Industries, Ltd.) 25 mass %

Diethylene glycol monomethyl ether (manufactured by Wako Pure Chemical Industries, Ltd.) 20 mass %

Emulgen P109 (manufactured by Kao Co., Ltd., non-ionic surfactant) 1 mass %

Ion exchange water remaining amount bringing the total to 100 mass %

<<Preparation of Recording Medium>>

At the time of image forming, coated paper (OK top coat+ (grade A2 gross) manufactured by Oji Paper Co., Ltd., basis weight 104.7 g/m$^2$) was prepared at the recording medium.

<<Image Forming>>

First, as shown in FIG. 1, an ink jet recording apparatus is prepared to be provided with the treatment liquid application unit 12 provided with the treatment liquid ejecting head 12S ejecting treatment liquid; the treatment liquid drying zone 13 drying the applied treatment liquid; the ink ejecting unit 14 ejecting each type of ink composition; the ink drying zone 15 drying the ejected ink composition; and the ultraviolet ray irradiation unit 16 provided with the ultraviolet ray irradiation lamp 16S capable of irradiating ultraviolet rays (UV), sequentially in the transport direction of the recording medium (in the direction of the arrow in the diagram).

The treatment liquid drying zone 13 is configured such that an air blower performing drying by blowing drying air is provided in the recording face side of the recording medium and an infrared heater is provided in the non-recording face side of the recording medium, whereby it is possible to evaporate (dry) 70 mass % or more of the water in the treatment liquid by adjusting the temperature and the air amount until 900 msec has passed since the starting of the application of the treatment liquid by the treatment liquid application unit. In addition, the ink ejecting unit 14 has a black ink ejecting head 30K, a cyan ink ejecting head 30C, a magenta ink ejecting head 30M, and a yellow ink ejecting head 30Y arranged in order in the transport direction (the direction of the arrow), in which each head is a 1200 dpi/10 inch width full line head (driving frequency: 25 kHz), and is capable of recording by ejecting each color in a single pass in the main scanning direction.

The transport speed of the recording medium can be adjusted in a range of 100 to 900 mm/s, and, in the image forming in the present embodiment, the transport speed is adjusted such that the landing interval (landing interval between types of ink) of the cyan ink (ink 1) and the yellow ink (ink 2) becomes the value shown in Table 1.

The above-described treatment liquid, the above-described cyan ink (ink 1), and the above-described yellow ink (ink 2) are respectively sequentially loaded into storage tanks (not shown) respectively linked to a treatment liquid ejecting head 12S, a cyan ink ejecting head 30C, and yellow ink ejecting head 30Y or the ink jet recording apparatus configured as shown in FIG. 1, and a two color image and a yellow monochromatic dot image are formed on the recording medium.

In addition, the application amount of the treatment liquid to the recording medium was set to 1.5 ml/m$^2$.

During the image forming, the cyan ink and the yellow ink were respectively ejected from the heads at a resolution of 1200 dpi×1200 dpi and an ink drop volume of 2.5 pl. The cyan ink and the yellow ink were ejected on the condition that the maximum application amount of the total of the cyan ink and the yellow ink became 11 ml/m$^2$.

In addition, when the cyan ink and the yellow ink were respectively ejected, adjustments were respectively performed such that the landing intervals (adjacent landing intervals) with respect to the main scanning direction of the ink droplets landing adjacently was 15 msec. The adjacent landing intervals were measured using stroboscopic photography according to the method of "Velocity of Drops in Full flight" described in NIP25: International Conference on Digital Printing Technologies and Digital Fabrication 2009, Sep. 20, 2009, p71-74.

<Formation of Two Color Image>

Specifically, the formation of a two color image was performed in the following manner.

First, after treatment liquid was ejected (applied) with a single pass from the treatment liquid ejecting head 12S onto the recording medium, the drying of the treatment liquid was performed in the treatment liquid drying zone 13, and the recording medium passed through the treatment liquid drying zone 13 before 900 msec passed from the start of the ejection of the treatment liquid. In the treatment liquid drying zone 13, while heating the treatment liquid landed in droplets with an infrared heater from the rear side (back face) of the droplet landing face such that the temperature of the treatment liquid droplet landing face became 40 to 45° C. blowing was performed for 5 seconds with warm air at 120° C. and 5 m/sec on the recording face using an air blower to dry.

Subsequently, onto the face (treatment liquid application face) of the side of the recording medium to which the treatment liquid is applied, cyan ink was applied in a solid shape from the ejecting head 30C in a single pass at a dot rate of 100%, and yellow ink was applied in a dot shape onto the applied cyan ink from the ejecting head 30Y in a single pass at a dot rate 4%, thereby forming a two color image.

At this time, the transport speed of the recording medium was adjusted such that the landing interval (landing interval between two types of ink) of the cyan ink (ink 1) and the yellow ink (ink 2) became the value shown in Table 1. In addition, the time from the completion of the above-described drying of the treatment liquid until the ink droplets of the cyan ink initially land on the recording medium was set so as to become 700 msec.

Subsequently, while heating the two color image formed on the recording medium with an infrared heater from the rear side (back face) of the ink droplet landing face in the same manner as in the ink drying zone 15, warm air of 120° C. was blown by an air blower, and drying was performed until a drying amount (the measurement method of the drying amount will be described below) of 68% was reached. At this time, the transport speed of the recording medium was adjusted so that the time from the time point at which the landing of the yellow ink droplets on the recording medium is completed until the recording medium is transported to the ink drying zone 15 and the drying start became 1 second.

After drying the two color image, in the ultraviolet ray irradiation unit 16, UV (ultraviolet) light (metal halide lamp manufactured by Eye Graphics Co., Ltd., maximum irradiation wavelength, 365 nm) is irradiated such that the total irradiation amount becomes 2 J/cm$^2$, and the two color image is UV cured.

<Formation of Yellow Monochromatic Dot Image>

In addition, the yellow monochromatic dot image was formed by performing an operation until the UV curing was completed in the same manner as the forming of the above-described two color image except that, in the forming of the above-described two color image, the application of the cyan ink was not performed, and the time from the completion of the above-described drying of the treatment liquid until the ink droplets of the yellow ink initially land on the recording medium was set so as to become 900 msec.

<<Measurement of Drying Amount>>

In the formation of the above-described two color image, a drying amount measurement sample 1 (without drying of the image) was prepared in the same manner as the forming of the above-described two color image except that the heating and blowing in the ink drying zone 15 and irradiation of UV light in the ultraviolet ray irradiation unit 16 were not performed. For the image in the drying amount measurement sample 1, the moisture amount $W_0$ included in the image was measured by the Karl Fischer method using a Karl Fischer moisture meter MKA-520 (manufactured by Kyoto Electronics Manufacturing Co., Ltd.).

Next, in the formation of the above-described two color image, a drying amount measurement sample 2 (with drying of the image) was prepared in the same manner as the forming of the above-described two color image except that the irradiation of UV light in the ultraviolet ray irradiation unit 16 was not performed. For the image in the drying amount measurement sample 2, the moisture amount $W_1$ included in the image was measured by the Karl Fischer method in the same manner as described above.

Based on the obtained moisture amount $W_0$ and moisture amount $W_1$, the drying amount (%) was calculated with the following formula 1.

$$(W_0-W_1)/W_9 \times 100 \quad \text{(Formula 1)}$$

<<Measurement of Dot Diameter φ1 and Dot Diameter φ2>>

The yellow dot diameter in the yellow monochromatic dot image after the above-described UV curing was measured for 30 dots and the average was set as the dot diameter φ1.

The yellow dot diameter in the two color image after the above-described UV curing was measured for 30 dots and the average was set as the dot diameter φ2.

Here, the measurement of the dot diameter was performed using a Dot Analyzer DA-6000 manufactured by Oji Scientific Instruments.

The ratio [φ1/φ2] of the dot diameter φ1 with respect to the dot diameter φ2 is shown by the following Table 1.

<<Evaluation>>

With regard to the two color image after the above-described UV curing, the following evaluation was performed.

The evaluation results are shown in the following Table 1.

<Yellow Dot Shape>

The yellow dot shape in the two color image after the above-described UV curing was observed with an optical microscope (300× magnification), and the yellow dot shape was evaluated according to the following evaluation standards.

—Evaluation Standards—

A: No division of the dot, dot ellipticity is 1.0 or more to 1.1 or less.

B: No division of the dot, dot ellipticity is 1.1 or more to 1.2 or less.

C: No division of the dot, dot ellipticity is 1.2 or more.

D: Dot is divided.

<Color Gamut (Color Reproduction Range)>

A two color image for color gamut evaluation was formed in the same manner as the forming of the above-described two color image except that, in the formation of the above-described two color image, the dot rate was changed from 4% to 100% when the yellow ink was applied onto the cyan ink.

Color measuring was performed no the two color image for color gamut evaluation after UV curing using a Spectroscan manufactured by Gretag Macbeth and plotted on a chromaticity diagram, and the distance from the origin was measured on the chromaticity diagram.

Next, using the a' value ("a" in the following formula A) and the b' value ("b" in the following formula A) on the chromaticity diagram, ΔE represented by the following formula A was determined (showing that the color gamut (color reproduction range) is wider as ΔE is greater).

$$\Delta E = (a^2+b^2)^{1/2} \quad \text{(Formula A)}$$

Based on the obtained ΔE, the color gamut (color reproduction range) was evaluated according to the following evaluation standards.

—Evaluation Standards—

A: ΔE was 85 or more, the color gamut was extremely wide.

B: ΔE was 78 or more to less than 85, the color gamut was wide.

C: ΔE was 73 or more to less than 78, the color gamut was within an acceptable range for practical use.

D: E was less than 73, the color gamut was narrow.

TABLE 1

| Example No. | Ink droplet speed during landing of Ink 2 (m/sec) | Content of polymer particles in Ink 1 (mass %) | Landing interval of Ink 1 and Ink 2 (msec) | $\phi 2/\phi 1$ | Two color image Dot shape of Ink 2 | Two color image Color gamut | Notes |
|---|---|---|---|---|---|---|---|
| 1 | 6 | 0.0 | 90 | 0.82 | A | D | Comparative Example |
| 2 | | | 120 | 0.85 | A | D | Comparative Example |
| 3 | | | 140 | 0.85 | A | D | Comparative Example |
| 4 | | | 200 | 0.87 | A | D | Comparative Example |
| 5 | | | 210 | 0.90 | A | C | Reference |
| 6 | | 1.0 | 90 | 0.90 | A | C | Example |
| 7 | | | 120 | 0.92 | A | B | Example |
| 8 | | | 140 | 0.92 | A | B | Example |
| 9 | | | 200 | 0.95 | A | A | Example |
| 10 | | | 210 | 0.98 | A | A | Reference |
| 11 | | 1.5 | 120 | 0.95 | A | A | Example |
| 12 | | | 140 | 0.95 | A | A | Example |
| 13 | | 2.0 | 90 | 1.00 | A | A | Example |
| 14 | | | 120 | 1.02 | A | A | Example |
| 15 | | | 140 | 1.02 | A | A | Example |
| 16 | | | 200 | 1.05 | B | A | Example |
| 17 | | 2.5 | 120 | 1.05 | A | A | Example |
| 18 | | | 140 | 1.05 | A | A | Example |
| 19 | | 3.0 | 120 | 1.08 | B | B | Example |
| 20 | | | 140 | 1.08 | B | B | Example |
| 21 | | 4.0 | 120 | 1.13 | C | D | Comparative Example |
| 22 | | | 140 | 1.13 | C | D | Comparative Example |
| 23 | 8 | 1.5 | 120 | 0.90 | A | C | Example |
| 24 | | | 140 | 0.90 | A | C | Example |
| 25 | | 2.0 | 90 | 0.98 | A | A | Example |
| 26 | | | 120 | 1.00 | A | A | Example |
| 27 | | | 140 | 1.00 | A | A | Example |
| 28 | | | 200 | 1.03 | A | A | Example |
| 29 | | 2.5 | 120 | 1.03 | A | A | Example |
| 30 | | | 140 | 1.03 | A | A | Example |
| 31 | | 3.0 | 120 | 1.06 | B | B | Example |
| 32 | | | 140 | 1.06 | B | B | Example |
| 33 | 10 | 2.0 | 120 | 0.90 | A | C | Example |
| 34 | | | 140 | 0.90 | A | C | Example |
| 35 | | 2.5 | 120 | 0.95 | A | A | Example |
| 36 | | | 140 | 0.95 | A | A | Example |
| 37 | | 3.0 | 90 | 1.00 | A | A | Example |
| 38 | | | 120 | 1.03 | A | A | Example |
| 39 | | | 140 | 1.03 | A | A | Example |
| 40 | | | 200 | 1.06 | A | A | Example |
| 41 | | 4.0 | 120 | 1.05 | C | D | Comparative Example |
| 42 | | | 140 | 1.05 | C | D | Comparative Example |

—Description of the Above Table 1 and the Below Table 2—

The ink droplet speed during landing of the ink 2 and the landing intervals ink 1 and ink 2 were measured using stroboscopic photography according to the method of "Velocity of Drops in Full flight" described in the NIP25: International Conference of Digital Printing Technologies and Digital Fabrication 2009, Sep. 20, 2009, p71-74. The ink droplet speed at the time of the landing of ink 2 is calculated based on the time in which the droplets of ink 2 move a distance (200 μm) from 200 μm above the landing face (ink 1 surface on the recording medium) to the landing face.

As shown in Table 1, the two color image formed by the image forming method of the present invention suppressed the narrowing of the color gamut and exhibited a wide color gamut despite the fact that the forming was performed at a high speed with the landing interval of the ink 1 and the ink 2 set as 200 msec or less.

On the other hand, in a two color image for comparison in which $\phi 2/\phi 1$ was less than 0.90, the color gamut was narrow in comparison with the two color image formed according to the image forming method of the present invention. The reason for this is considered to be that the dot diameter of ink 2 was small and minute gaps were generated in the image by the ink 2.

In addition, in a two color image for comparison in which $\phi 2/\phi 1$ exceeded 1.10, the color gamut was narrow in comparison with the two color image formed according to the image forming method of the present invention. The reason for this is considered to be that minute gaps were generated in the image by the ink 2 because the dot shape of the ink 2 was disturbed.

Examples 43 to 66

The evaluation of the Examples 43 to 66 was performed in the same manner as Examples 1 to 42 except that the above-described polymerizable compound 1 (bifunctional polymerizable compound) used in the preparation of the cyan ink in Examples 1 to 42 was changed to the same amount of the above-described polymerizable compound a (tetrafunctional polymerizable compound). In the examples 43 to 66, the ink droplet speed during landing of ink 2, the polymer particle content in ink 1, and the landing interval between ink 1 and ink 2 were adjusted as shown in the following Table 2.

The evaluation results are shown in the following Table 2.

TABLE 2

| Example No. | Ink droplet speed during landing of Ink 2 (m/sec) | Content of polymer particles in Ink 1 (mass %) | Landing interval of Ink 1 and Ink 2 (msec) | $\phi2/\phi1$ | Two color image Dot shape of Ink 2 | Two color image Color gamut | Notes |
|---|---|---|---|---|---|---|---|
| 43 | 6 | 1.0 | 90 | 0.95 | A | C | Example |
| 44 | | | 120 | 0.97 | A | B | Example |
| 45 | | | 140 | 0.97 | A | B | Example |
| 46 | | | 200 | 1.00 | A | A | Example |
| 47 | | 1.5 | 120 | 1.00 | A | A | Example |
| 48 | | | 140 | 1.00 | A | A | Example |
| 49 | | 2.0 | 90 | 1.95 | A | A | Example |
| 50 | | | 120 | 1.07 | A | A | Example |
| 51 | | | 140 | 1.07 | A | A | Example |
| 52 | | | 200 | 1.10 | B | A | Example |
| 53 | 8 | 1.0 | 120 | 0.93 | A | C | Example |
| 54 | | | 140 | 0.93 | A | C | Example |
| 55 | | 1.5 | 120 | 0.95 | A | B | Example |
| 56 | | | 140 | 0.95 | A | B | Example |
| 57 | | 2.0 | 90 | 1.03 | A | A | Example |
| 58 | | | 120 | 1.05 | A | A | Example |
| 59 | | | 140 | 1.05 | A | A | Example |
| 60 | | | 200 | 1.08 | A | A | Example |
| 61 | 10 | 1.0 | 120 | 0.90 | A | C | Example |
| 62 | | | 140 | 0.90 | A | C | Example |
| 63 | | 1.5 | 120 | 0.93 | A | C | Example |
| 64 | | | 140 | 0.93 | A | C | Example |
| 65 | | 2.0 | 120 | 0.98 | A | B | Example |
| 66 | | | 140 | 0.98 | A | B | Example |

As shown in Table 2, the two color image formed by the image forming method of the embodiment suppressed the narrowing of the color gamut and exhibited a wide color gamut despite the face that the forming was performed at a high speed with the landing interval of the ink 1 and the ink 2 set as 200 msec or less. Furthermore, when the tetrafunctional polymerizable compound represented by the General Formula (2) was used (in particular, in a range where the polymer particle content in ink 1 is 2.0 mass % or less), it was confirmed that $\phi2/\phi1$ was easy to adjust in a range of 0.90 or more to 1.10 or less.

This application claims priority under 35 U.S.C. §119 of Japanese Patent application JP 2012-044116, filed on Feb. 29, 2012, the entire contents of which are hereby incorporated by reference.

What is claimed is:

1. An image forming method comprising:
    applying a treatment liquid containing an aggregation component capable of aggregating components in an ink composition to a recording medium to form a treatment liquid application face;
    applying a first ink composition containing a pigment, water, and polymer particles of which a content is 1.0 mass % to 3.0 mass % with respect to the entire composition to the treatment liquid application face using an ink jet method; and
    applying a second ink composition including a pigment and water and having a different hue to the first ink composition onto the applied first ink composition at an ink droplet speed of 6 m/sec to 10 m/sec to form a multi-color image using an ink jet method,
    in which an interval from a landing time point of the first ink composition to a landing time point of the second ink composition is 200 msec or less, and
    a dot diameter $\phi2$ of the second ink composition applied onto the first ink composition, and a dot diameter $\phi1$ of the second ink composition applied onto the treatment liquid application face in an ink droplet amount equal to an ink droplet amount in the forming of the multi-color image satisfy a relationship of $0.90 \leq \phi2/\phi1 \leq 1.10$.

2. The image forming method according to claim 1, wherein the recording medium is coated paper having a pigment layer on at least one face of a support in which cellulose pulp is a main component.

3. The image forming method according to claim 2, wherein the first ink composition and the second ink composition further contain a polymerizable compound.

4. The image forming method according to claim 3, wherein at least one of the first ink composition, the second ink composition, and the treatment liquid further contains a polymerization initiator.

5. The image forming method according to claim 2, wherein the first ink composition and the second ink composition further contain a polyfunctional acrylamide compound as a polymerizable compound.

6. The image forming method according to claim 5, wherein at least one of the first ink composition, the second ink composition, and the treatment liquid further contains a polymerization initiator.

7. The image forming method according to claim 6, wherein the second ink composition further contains polymer particles of which the content is 1.0 mass % to 3.0 mass % with respect to the entire composition.

8. The image forming method according to claim 7, further comprising:
drying the multi-color image after applying the treatment liquid, applying the first ink composition, and applying the second ink composition, and
curing the multi-color image by irradiation of active energy rays with respect to the multi-color image after drying the multi-color image.

9. The image forming method according to claim 1, wherein the first ink composition and the second ink composition further contain a polymerizable compound.

10. The image forming method according to claim 9, wherein at least one of the first ink composition, the second ink composition, and the treatment liquid further contains a polymerization initiator.

11. The image forming method according to claim 9, further comprising:
drying the multi-color image after applying the treatment liquid, applying the first ink composition, and applying the second ink composition, and
curing the multi-color image by irradiation of active energy rays with respect to the multi-color image after drying the multi-color image.

12. The image forming method according to claim 1, wherein the first ink composition and the second ink composition further contain a polyfunctional acrylamide compound as a polymerizable compound.

13. The image forming method according to claim 12, wherein at least one of the first ink composition, the second ink composition, and the treatment liquid further contains a polymerization initiator.

14. The image forming method according to claim 1, wherein the second ink composition further contains polymer particles of which the content is 1.0 mass % to 3.0 mass % with respect to the entire composition.

15. The image forming method according to claim 1, wherein the first ink composition and the second ink composition are respectively applied at intervals of 20 msec or less.

* * * * *